United States Patent [19]
Kamada et al.

[11] Patent Number: 5,876,305
[45] Date of Patent: Mar. 2, 1999

[54] AUTOMATIC TRANSMISSION CONTROL SYSTEM FOR AUTOMOBILES

[75] Inventors: Shinya Kamada; Shin Nakano; Mitsukazu Tasaka; Kenji Sawa; Yasunari Nakayama; Mitsuo Yasuno, all of Hiroshima, Japan

[73] Assignee: Mazda Motor Corporation, Hiroshima, Japan

[21] Appl. No.: 941,300

[22] Filed: Sep. 30, 1997

[30] Foreign Application Priority Data

Sep. 30, 1996 [JP] Japan .................................. 8-280009

[51] Int. Cl.⁶ .................................................. F16H 61/00
[52] U.S. Cl. .............................................................. 477/153
[58] Field of Search ...................................... 477/147, 153

[56] References Cited

U.S. PATENT DOCUMENTS 5,188,005  2/1993  Sankpal et al. ............................ 477/153

FOREIGN PATENT DOCUMENTS 7119820  5/1995  Japan .

*Primary Examiner*—Dirk Wright
*Attorney, Agent, or Firm*—Sixbey, Friedman, Leedom & Ferguson, P.C.; Gerald J. Ferguson, Jr.

[57] ABSTRACT

An automatic transmission control system, which includes a 2-4 brake having a servo apply fluid chamber and a servo release fluid chamber and a 3-4 clutch having a fluid chamber and causes a 3-2 shift by engaging the 2-4 brake and disengaging the 3-4 clutch, controls engaging pressure for the 3-4 clutch by way of controlling servo apply pressure for the 2-4 brake to disengage the 3-4 brake so as thereby to increase turbine speed during the 3-2 gear shift and, at near the end of the 3-2 gear shift, brings the 2-4 brake into engagement. During control of disengagement of the 3-4 clutch, the pressure difference between servo apply pressure and servo release pressure is changed to become greater at the beginning of the gear shift.

6 Claims, 26 Drawing Sheets

AUTOMATIC TRANSMISSION CONTROL SYSTEM FOR AUTOMOBILES

BACKGROUND OF THE INVENTION

1. Field of the Invention

This invention relates to an automatic transmission control system for an automobile, and, in particular, to an automobile automatic transmission system of the type having specific friction coupling elements simultaneously engaged or applied and disengaged or released to provide a specific gear.

2. Description of the Related Art

Automatic transmissions for automotive vehicles, which typically comprise a torque converter and a transmission gear mechanism, are automatically shifted into desired gears by selectively engaging or applying and disengaging or releasing a plurality of friction coupling elements such as clutches and brakes. This type of automatic transmission is provided with a hydraulic control circuit to supply/discharge hydraulic fluid to these friction coupling elements. As shown in, for example, Japanese Unexamined Patent Publication No. 7-119820, a band-brake type of friction coupling element which cooperates with a servo cylinder as an actuator is used together with ordinary friction coupling elements which are engaged with hydraulic fluid. This servo cylinder actuator having a servo apply fluid chamber and a servo release fluid chamber separated by a spring loaded piston applies a brake when only the apply chamber is supplied with hydraulic fluid and release a brake when both apply chamber and the release chamber are supplied with fluid chamber or when neither the apply chamber nor the release chamber are supplied with any hydraulic fluid. In the case where the frictional coupling element operated by the servo cylinder actuator is a so-called 2-4 brake which is applied in a second speed gear or in a fourth speed gear, during a shift from a first speed gear to the second speed gear, the servo cylinder actuator with both chambers remaining empty is caused to apply the 2-4 brake when receiving hydraulic fluid in the apply chamber in a state where both chambers are empty is supplied. On the other hand, during a shift from a third speed gear to the second speed gear or the fourth speed gear, the servo cylinder actuator with both chambers remaining supplied with fluid chamber is caused to apply the 2-4 brake when discharging hydraulic fluid from the release chamber in a state where both chambers are empty is supplied.

In the automatic transmission of this type, a specific gear needs to disengage one friction coupling element simultaneously with engaging another specific gear. For example, during a down-shift from the third speed gear to the second speed gear (a 3-2 shift), while the 2-4 brake is applied by discharging hydraulic fluid from the release chamber of the servo cylinder actuator, a 3-4 clutch, which is engaged for the third speed gear and the fourth speed gear, is disengaged by discharging hydraulic fluid from its fluid chamber. During an up-shift from the third speed gear to the fourth speed gear (a 3-4 shift), while the 2-4 brake is applied by discharging hydraulic fluid from the release chamber of the servo cylinder actuator, a forward clutch, which is engaged for the first, second and third speed gears, is disengaged by discharging hydraulic fluid from its fluid chamber. In such a case, since discharging hydraulic fluid from the release chamber of the 2-4 brake and the fluid chamber of the 3-4 clutch or the forward clutch, simultaneously, these release chamber and the fluid chambers are communicated to discharge hydraulic fluid under operation of a fluid control valve, such as a duty solenoid valve.

In the case of a torque demand 3-2 shift following an increase in engine load, and a manual 3-2 shift with the engine remaining loaded, in order to cause an increase in turbine speed smoothly during the gear shift, it is always desired to feedback control engaging force of the 3-4 clutch according to a deviation from an instantaneous target speed. In such a case, the utilization may be made of controlling hydraulic fluid in the apply chamber of the 2-4 brake to perform the feedback control. Specifically, since the release chamber of the 2-4 brake is adjacent to the apply chamber of the 2-4 brake through the piston and is in communication with the fluid chamber of the 3-4 clutch, the hydraulic fluid for engaging the 3-4 clutch is controlled by means of control of hydraulic fluid in the apply chamber of the 2-4 brake. Accordingly, the utilization may be made of a first and a second pressure control valve to control the pressure of hydraulic fluid in the servo apply fluid chamber of the 2-4 brake and the amount of hydraulic fluid discharged from the release chamber of the 2-4 brake and the fluid chamber of the 3-4 clutch, respectively, with an effect of increasing accuracy of the feedback control.

A torque demand 3-2 shift is made with a driver's intention to accelerate. While there is, accordingly, a strong demand for increasing the responsiveness of the transmission which is achieved by accelerating release of the 3-4 brake, it is required for the 2-4 brake to operate smoothly so as to avoid shift shocks, which are somewhat technically conflicting requirements. A manual 3-2 shift which is tried with the engine throttle held fully closed to apply engine braking or a 3-4 shift caused by fully closing the engine throttle is caused not by disengaging the 3-4 clutch or the forward clutch but engaging mainly the 2-4 brake. In order to achieve these shifts as quickly as possible, the 2-4 brake has the necessity to satisfy those two conflicting requirements.

SUMMARY OF THE INVENTION

It is an objective of the present invention to provide an automatic transmission control system for an automotive vehicle which accomplishes a consistent and satisfactory gear shift which needs to disengage a specific one of a plurality of friction coupling elements while engaging another specific friction coupling element.

The foregoing object of the present invention is achieved by providing a control system including a hydraulic pressure control circuit for an automatic transmission which comprises a transmission gear mechanism and a plurality of friction coupling elements, installed between a driving torque generator and drive wheels of an automotive vehicle, in which the friction coupling elements are selectively engaged and disengaged to change a torque path of the transmission gear mechanism so as thereby to provide desired gears and include at least a first friction coupling element provided with a servo apply fluid chamber and a servo release fluid chamber separated by a piston which is engaged when only the servo apply fluid chamber is supplied with hydraulic fluid and disengaged when both servo apply fluid chamber and servo release fluid chamber are supplied with hydraulic fluid and a second friction coupling element having a fluid chamber capable of being brought into communication with the servo release fluid chamber of the first friction coupling element which is engaged when the fluid chamber of the second friction coupling element is supplied with hydraulic fluid. The hydraulic control system is characterized in that, when shifting the transmission gear mechanism from a first gear which is achieved by supplying hydraulic fluid to the servo apply fluid chamber and the servo release fluid chamber of the first friction coupling element and the fluid chamber of the second friction coupling element to disengage the first friction coupling element and engage the second friction coupling element to a second gear which is achieved by discharging hydraulic fluid from both servo release fluid chamber of the first friction coupling element and fluid chamber of the second friction coupling element in communication with the servo apply fluid chamber of the first friction coupling element to engage the first friction coupling element and disengage the second friction coupling element, hydraulic fluid pressure is controlled to make a difference in pressure between these servo apply fluid chamber and servo release fluid chamber of the first friction coupling element larger before a lapse of a specified interval from a commencement of a shift from the first gear to the second gear than after a lapse of the specified interval.

The control system counts a time between a first gear shift to the first gear and a second shift to the second gear succeeding the first shift and changes the pressure difference at the beginning of the second shift according to the counted time.

The control system may establish the pressure difference for a shift from the first gear to the second gear by substituting hydraulic fluid pressure of the servo apply fluid chamber reduced by a specified value for hydraulic fluid pressure of the servo release fluid chamber.

The control system may control hydraulic fluid pressure in the servo apply fluid chamber of the first friction coupling element to make the pressure difference for a shift from the first gear to the second gear smaller when the engine operates with loads lower than a specified value than when the engine operates with loads higher than the specified value.

With the automatic transmission control system of the invention, while discharging of hydraulic fluid from the servo release fluid chamber of the first friction coupling element and the fluid chamber of the second friction coupling element is accelerated to force the gear shift, the pressure difference is made smaller after a lapse of a specified time from the beginning of the gear shift, so as to bring the first friction coupling element in to engagement gently with a relatively low engaging force. Accordingly, the automatic transmission causes a gear shift well responding to a shift demand without encountering a large shift shock.

Further, changing the pressure difference at the beginning of a gear shift prevents the first friction coupling element from abruptly engaging before the piston has completed its movement in the engaging direction and immediately after a completion of disengagement of the first friction coupling element during a previous gear shift, i.e. before hydraulic fluid has not yet been supplied sufficiently into the servo release fluid chamber of the first friction coupling element. This also prevent an occurrence of significant shift shocks.

Due to substituting hydraulic fluid pressure of the servo apply fluid chamber reduced by a specified value for hydraulic fluid pressure of the servo release fluid chamber for establishing the pressure difference during a gear shift from the first to the second gear, the feedback control of hydraulic fluid pressure in the servo apply fluid chamber to control the turbine speed effected in, for example, a torque demand down-shift and the control of the pressure difference are allocated to hydraulic fluid in the servo apply and the servo release fluid chamber, which makes the control easy with an effect of improving the accuracy of control.

In the case where a manual down-shift from the first to the second gear in a region of lower engine loads is demanded, the pressure difference is small, discharging hydraulic fluid from the servo release fluid chamber of the first friction coupling element and the fluid chamber of the second friction coupling element is accelerated even in circumstances where hydraulic fluid is at relatively lower pressure. Specifically, during a gear shift from the first to the second gear, engagement of the first friction coupling element is achieved through movement of the piston which is caused with the pressure difference between the servo apply and the servo release fluid chamber. In the low engine load region, there possibly occurs a state where the pressure in the servo release fluid chamber does not cause a substantive decline due to a movement of the piston toward the servo release fluid chamber which is caused by the pressure difference. As a result, a delay in disengaging the second friction coupling element takes place, so as to cause aggravation of responsiveness of the gear shift during a manual shift down. However, the automatic transmission control system of the invention in which the pressure difference is lowered in such a low engine load region accelerates discharging hydraulic fluid from the servo release fluid chamber of the first friction coupling element, and hence disengagement of the second friction coupling element.

According to another aspect of the invention, in a control system including a hydraulic pressure control circuit for an automatic transmission which comprises a transmission gear mechanism and a plurality of friction coupling elements, one of which is provided with a servo apply fluid chamber and a servo release fluid chamber separated by a piston and is engaged when only the servo apply fluid chamber is supplied with hydraulic fluid and disengaged when both servo apply and servo release fluid chamber are supplied with hydraulic fluid. When shifting the transmission gear mechanism from a first gear which is achieved by supplying hydraulic fluid to both servo apply and servo release fluid chamber of the friction coupling element to disengage the friction coupling element to a second gear which is achieved by discharging hydraulic fluid from the servo release fluid chamber of the friction coupling element to engage the friction coupling element, pressure in the servo apply fluid chamber is controlled to be higher for a specified period of time from a commencement of the shift than after a termination of the specified period of time.

This period of time may be established according to hydraulic fluid pressure and an increase in volume of the servo apply fluid chamber in the period of time.

With the automatic transmission control system, movement of the piston of the friction coupling element is accelerated in a direction in which the piston causes engagement of the friction coupling element and, however, engagement of the friction coupling element is caused gently with hydraulic fluid which is lowered in pressure during a gear shift as compared with the beginning of the gear shift. This makes a manual down-shift and a back-out shift take place quickly and smoothly. Furthermore, the period of time is precisely adjusted to a time needed by the piston until almost completing engagement of the friction coupling element. As a result, it is realized to bring the friction coupling element into engagement while shortening the time necessary for the piston to complete its movement required to force the friction coupling element to engage.

BRIEF DESCRIPTION OF THE DRAWINGS

The foregoing and other objects and features of the present invention will be clearly understood from the following detailed description of preferred embodiments when read in conjunction with the accompanying drawings in which.

DETAILED DESCRIPTION OF THE PREFERRED EMBODIMENT

Figure 1:
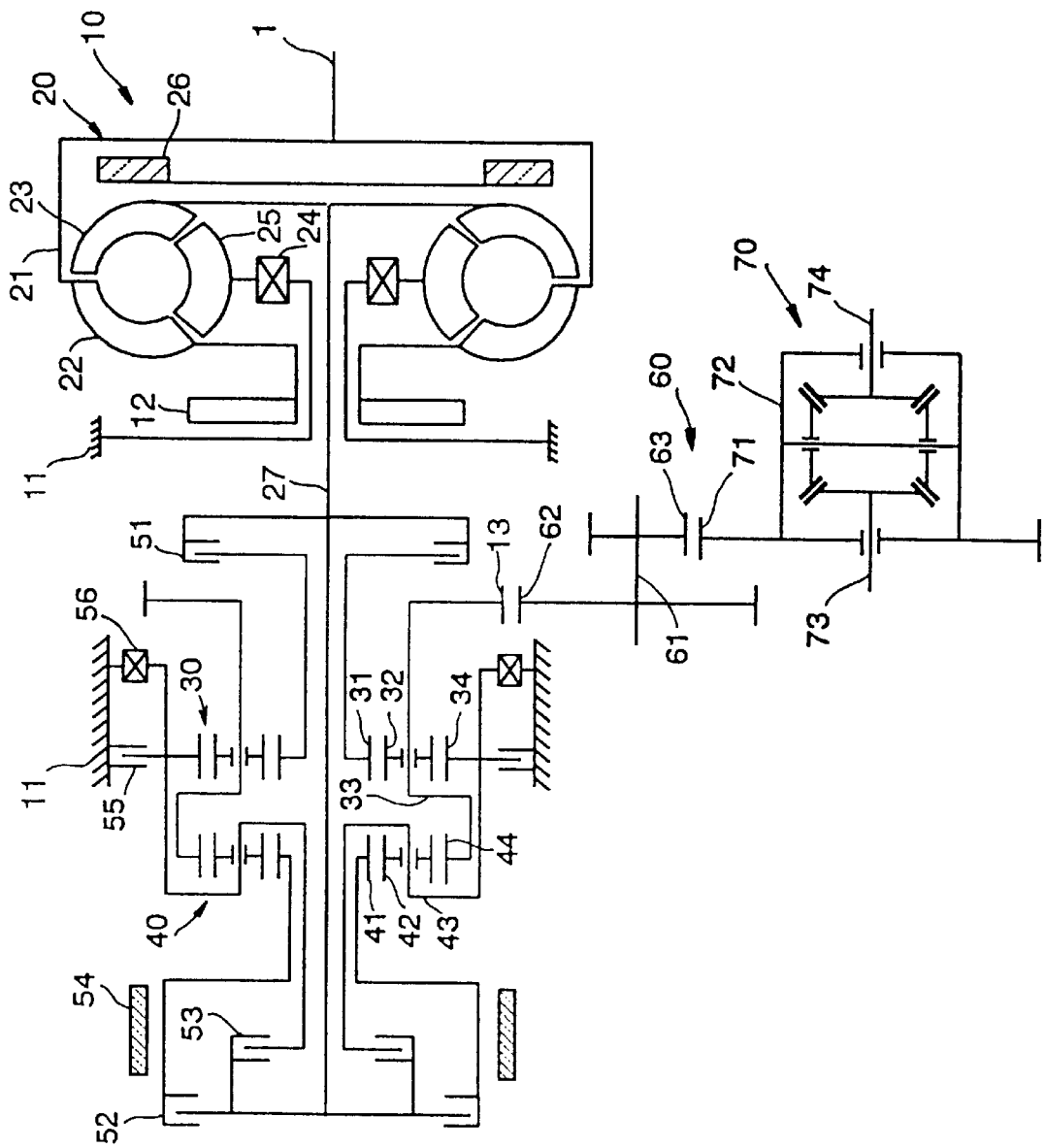
FIG. 1 is a schematic skeleton view showing a mechanical structure of an automatic transmission equipped with a control system of the present invention.

Referring to the drawings in detail, in particular, to FIG. 1 which is a skeleton diagram schematically showing the entire mechanical structure of an automatic transmission 10 in which an automatic transmission control system in accordance with an embodiment of the present invention is incorporated, the automatic transmission 10 has, as its main structural elements, a hydraulic torque converter 20 and front and rear planetary gear mechanisms 30 and 40 arranged contiguously to each other as a transmission gear mechanism which are driven by means of output torque of the torque converter 20. The automatic transmission 10 further has a plurality of friction coupling elements 51–55, such as clutches, brakes and so forth, and a one-way clutch 56 which are selectively brought into engagement and disengagement to switch the power transmission path of the front and rear planetary gear mechanisms 30 and 40, shifting the automatic transmission 10 into desired gears, namely first (1st) to fourth (4th) speed gears in a drive (D) range, first (1st) to third (3rd) gears in a second (S) range, first (1st) and second (2nd) gears in a low (L) range, and a reverse (RV) gear in a reverse (R) range.

The hydraulic torque converter 20 is comprised of a pump 22 located within a converter housing 21 which is fastened to an engine output shaft 1, a turbine 23 which is arranged to face to the pump 22 and driven by the pump 22 through hydraulic fluid, and a stator 25 which is supported between the pump 22 and the turbine 23 by the transmission housing 11 through a one-way clutch 24 and does multiply engine output torque. The hydraulic torque converter 20 is provided with a lockup clutch 26 between the converter housing 21 and the turbine 23 to mechanically lock the engine output shaft 1 and the turbine 23 together when the lockup clutch 26 is activated. Transmission of engine torque is made from the turbine 23 to the front and rear planetary gear mechanisms 30 and 40 through a turbine shaft 27 fastened to the turbine 23. An oil pump 12, which is driven by the engine output shaft 1 through the converter housing 21 of the hydraulic torque converter 20, is arranged on one side of the hydraulic torque converter 20 opposite to the engine.

Each of the front and rear planetary gear mechanisms 30 and 40 is comprised of a sun gear 31, 41, and a plurality of pinions 32, 42 in mesh with the sun gear 31, 41, a pinion carrier 33, 43 which supports these pinions 32, 42, and a ring gear 34, 44 in mesh with the pinions 32, 42. There are provided in the transmission gear mechanism a forward clutch (FWCL) 51 between the turbine shaft 27 and the sun gear 31 of the front planetary gear mechanism 30, a reverse clutch (RVCL) 52 between the turbine shaft 27 and the sun gear 41 of the rear planetary gear mechanism 40, a 3rd–4th clutch (3-4CL) 53 between the turbine shaft 27 and the pinion carrier 43 of the rear planetary gear mechanism 40, and a 2nd–4th (2-4) brake (2-4BR) 54 which locks the sun gear 41 of the rear planetary gear mechanism 40. Between these front and rear planetary gear mechanisms 30 and 40, the pinion carrier 33 and the ring gear 34 of the front planetary gear mechanism 30 are linked with the ring gear 44 and the pinion carrier 43 of the rear planetary gear mechanism 40, respectively. A low-reverse brake (LRBR) 55 and the one-way clutch (OWCL) 56 are arranged in parallel with respect to these pinion carrier 33 and ring gear 44 and interposed between these pinion carrier 33 and ring gear 44 and the transmission housing 11. Further, there is provided in the transmission gear mechanism an output gear 13 in mesh with the pinion carrier 33.

An intermediate transmission mechanism 60 includes a front intermediate gear 62 fastened to an idle shaft 61 and being in mesh with the output gear 13 and a second intermediate gear 63 fastened to the idle shaft 61 and being in mesh with an input gear 71 of a differential gear 70. Out put torque from the automatic transmission 10 is transmitted to the differential case 72 from the output gear 13 through these front and rear intermediate gears 61 and 63 to drive right and left axles 73 and 74.

Figure 2:
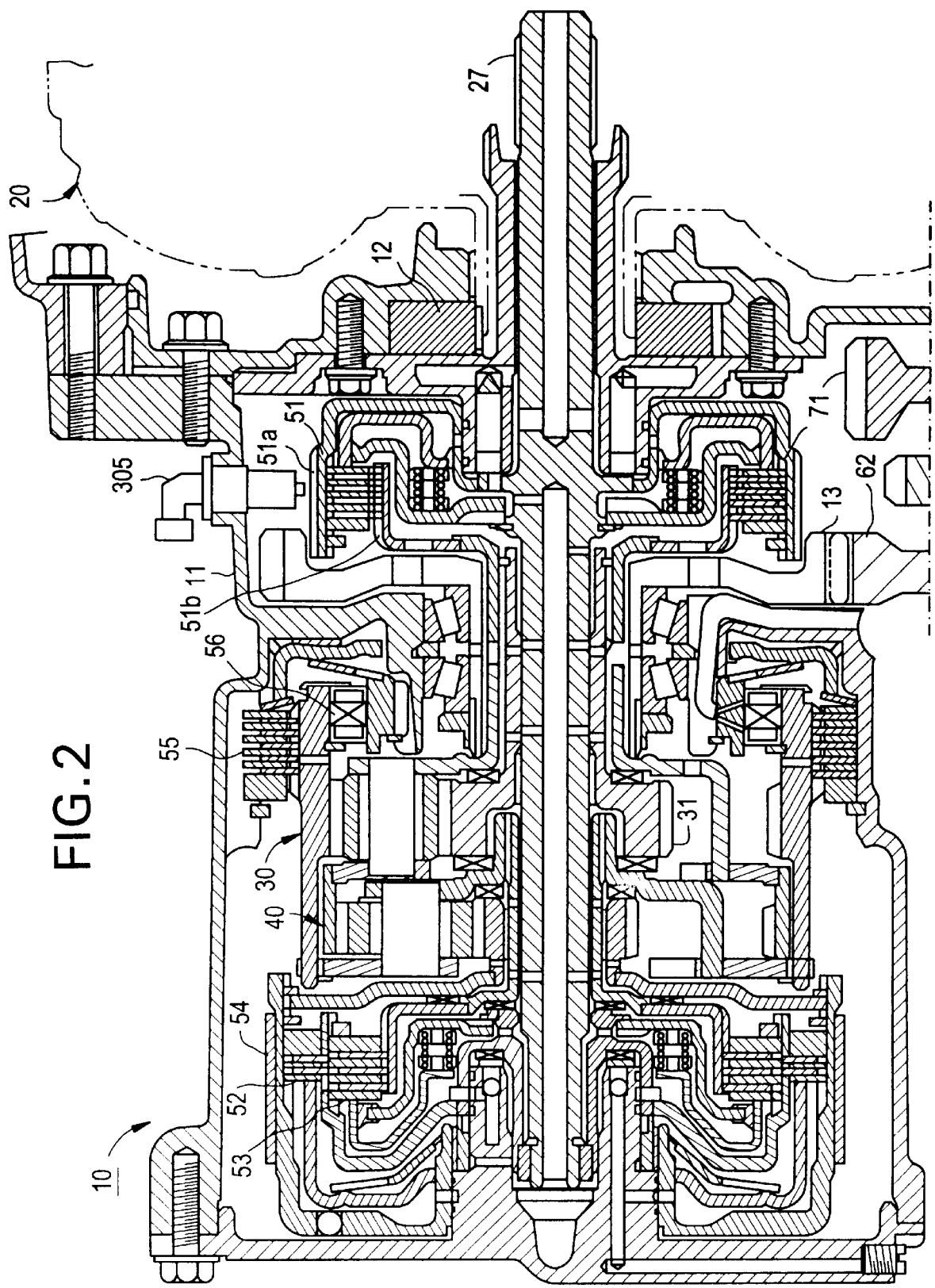
FIG. 2 is a cross-sectional view of a transmission gear mechanism of the automatic transmission shown in FIG. 1.

The transmission gear mechanism of the automatic transmission 10 shown in the skeleton diagram in FIG. 1 is practically constructed as shown in FIG. 2. As shown in FIG. 2, the automatic transmission 10 is provided with a turbine speed sensor 305 installed in the transmission housing 11 which is used in control as will be described later.

Operation of the friction coupling elements (brakes and clutches) 51–55 and one-way clutch (OWCL) 56 in regard to the specified transmission gears is described in Table I in which the low-reverse clutch (LRBR) 55 is engaged only for the 1st gear.

TABLE I

| Gear | FWCL (51) | 2-4BR (54) | 3-4CL (53) | LRBR (55) | RVCL (52) | OWCL (56) |
|---|---|---|---|---|---|---|
| 1ST | ○ | | | (○) | | ○ |
| 2ND | ○ | ○ | | | | |
| 3RD | ○ | | ○ | | | |
| 4TH | | ○ | ○ | | | |
| RV | | | | | ○ | ○ |

Figure 3:
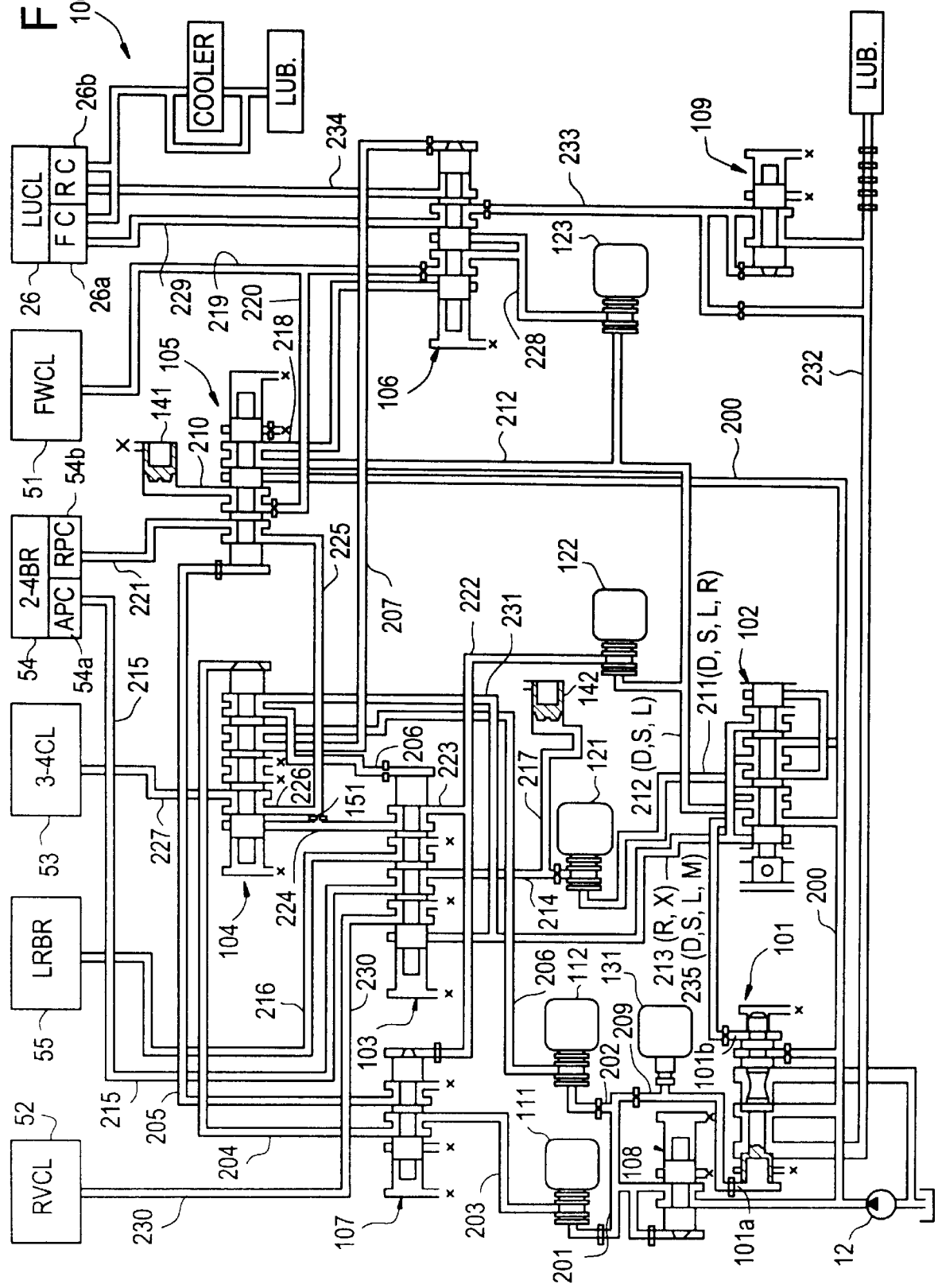
FIG. 3 is a hydraulic control circuit of an automatic transmission control system in accordance with an embodiment of the present invention.

FIG. 3 is a circuit diagram showing a hydraulic fluid pressure control system for supplying the hydraulic fluid to and releasing the hydraulic fluid from the fluid chambers of the friction coupling elements 51–55 shown in FIGS. 1 and 2. It is to be noted that among the friction coupling elements, the 2-4 brake (2-4BR) 54, which is comprised of a band brake, has a servo apply hydraulic fluid pressure chamber 54a (which is referred to as a servo apply fluid chamber for simplicity) and a servo release hydraulic fluid pressure chamber (which is referred to as a servo release fluid chamber for simplicity) 54b into which the hydraulic fluid is supplied. Specifically, when the hydraulic fluid is supplied into only the servo apply chamber 54a, the 2-4 brake (2-4BR) 54 is applied or engaged, and when the hydraulic fluid is supplied into only the servo release chamber 54b, or when the hydraulic fluid is not supplied into the servo apply chamber 54a nor into the servo release chamber 54b, as well as when the hydraulic fluid is supplied into both servo apply chamber 54a and servo release chamber 54b, the 2-4 brake (2-4BR) 54 is released or disengaged. Each of the remaining friction coupling elements 51–53 and 55 has a single fluid chamber, and is engaged when the hydraulic fluid is supplied into the fluid chamber thereof.

As shown in FIG. 3 in detail, the hydraulic control system 100 is provided with, as the essential structural elements, a regulator valve 101 for generating a specified level of line pressure by regulating discharge hydraulic fluid of the oil pump 12, a manual shift valve 102 which is manually operated to switch the ranges, and various switching valves, including a low-reverse valve 103, a bypass valve 104, a 3-4 shift valve 105 and a lockup control valve 106, for switching the fluid paths leading to the friction coupling elements 51–55, respectively, which are activated during gear shifts. The hydraulic control system 100 is further provided with first and second ON-OFF solenoid valves (which are hereafter referred to simply as first and second solenoid valves or SVs) 111 and 112 in order to operate these switching valves 103–106, a solenoid relay valve (which is hereafter referred to simply as a relay valve or SRV) 107 which switches the destination of the supply of hydraulic fluid from the first solenoid valve 111, and first, second and third duty solenoid valves 121, 122 and 123 (which are hereafter referred to as first, second and third duty valves or DSVs) which perform controlled generation, regulation and discharge of the hydraulic fluid to be supplied into the fluid chambers of the friction coupling elements 51–55.

The first and second solenoid valves (SVs) 111 and 112 and the first, second, and third duty solenoid valves (DSV) 121, 122 and 123 are of a three-way type which provides communication of the fluid path between upstream and downstream therefrom and drains the hydraulic fluid from the fluid path downstream therefrom. During draining, because the fluid path upstream from each valve is shut off, the oil pump 12 does not discharge the hydraulic fluid uselessly from the fluid path upstream the valve, reducing drive loss.

When each of the first and second solenoid valves (SVs) 111 and 112 is activated or turned ON, it brings the fluid paths on upstream and downstream sides therefrom into communication. Further, when each of the first, second and third duty solenoid valves (DSVs) 121, 122 and 123 is turned OFF, in other words, when the duty solenoid valve (DSV) 121, 122, 123 operates at a duty ratio of 0% (a rate of an ON duration of time in one ON-OFF cycle), it fully opens to bring the fluid paths on upstream and downstream sides thereof into complete communication; when turned ON, in other words, when operates at a duty ratio of 100%, it drains the hydraulic fluid from the fluid path downstream therefrom by shutting off the fluid path upstream thereof; and when operates at an intermediate duty ratio, it generates a hydraulic fluid pressure in the fluid path downstream therefrom regulated according to the duty ratio by using a hydraulic fluid pressure in the fluid path upstream therefrom as a source fluid pressure.

The line hydraulic fluid pressure regulated through the regulator valve 101 is supplied to the manual shift valve 102 through a main pressure line 200 as well as to a solenoid reducing valve 108 (which is hereafter referred to simply as a reducing valve) and the 3-4 shift valve 105. The line pressure supplied to the reducing valve 108 is reduced to a fixed level and then supplied to the first and second solenoid valves (SVs) 111 and 112 through pressure lines 201 and 202, respectively. While the fixed level line pressure is supplied to the solenoid relay valve (SRV) 107 through a pressure line 203 when the first solenoid valve (SV) 111 is ON, it is further supplied to a control port of the bypass valve 104 as a pilot hydraulic fluid pressure through a pressure line 204 when the spool of the solenoid relay valve (SRV) 107 is placed in its right-end position as viewed in FIG. 3 to force the spool of the bypass valve 104 toward the left-end position. On the other hand, when the solenoid relay valve (SRV) 107 places its spool in the left-end position, the fixed level line pressure is supplied to a control port of the 3-4 shift valve 105 as a pilot pressure through a pressure line 205 to force the spool of the 3-4 shift valve 105 toward the right-end position.

The fixed level line pressure provided from the reducing valve 108 is further supplied to the bypass valve 104 through a pressure line 206 when the second solenoid valve (SV) 112 is ON; supplied as the pilot pressure to a control port of the lockup control valve 106 through a pressure line 207 when the spool of the bypass valve 104 is placed in its right-end position to force the spool of the lockup control valve 106 toward the left-end position; and supplied to a control port of the low-reverse valve 103 through a pressure line 208 when the spool of the bypass valve 104 is placed its left-end positioned to force the spool of the low-reverse valve 103 toward the left-end position. Additionally, the fixed level line pressure from the reducing valve 108 is supplied to a control port 101a of the regulator valve 101 through a pressure line 209. In this event, the fixed level line pressure is adjusted according to, for example, opening of an engine throttle by way of a linear solenoid valve 131 in the pressure line 209 and accordingly, the line pressure is adjusted according to throttle opening by way of the regulator valve 101.

The main pressure line 200 leading to the 3-4 shift valve 105 is brought into communication with a first accumulator 141 through a pressure line 210 when the 3-4 shift valve 105 has placed its spool in the right-end position to introduce the line hydraulic pressure into the accumulator 141. On the other hand, the line pressure supplied to the manual shift valve 102 from the main pressure line 200 is introduced into a first output pressure line 211 and a second output pressure line 212 for forward ranges, i.e. the drive (D) range, the second speed (S) range and the low speed (L) range; into the first output pressure line 211 and a third output pressure line 213 for the reverse (R) range; and into the third output pressure line 213 for the neutral (N) range.

The first output pressure line 211 leads to the first duty solenoid valve (DSV) 121 to supply the line pressure as a control source pressure to the first duty solenoid-valve (DSV) 121. The first duty solenoid (DSV) 121 at its downstream side leads to the low-reverse valve 103 through a pressure line 214; leads to the servo apply fluid chamber 54a of the 2-4 brake (2-4BR) 54 through a servo apply pressure line 215 when the low-reverse valve 103 has placed the spool in the right-end position; and further leads to the fluid chamber of the low- reverse brake (LRBR) 55 through a low-reverse brake pressure line 216 when the low-reverse valve 103 has placed the spool in the left-end position. A pressure line 217 branches off from the pressure line 214 and leads to a second accumulator 142. The second output pressure line 212 leads to both second duty solenoid valve (DSV) 122 and third duty solenoid valve (DSV) 123 to supply the line pressure as a control source pressure to these duty solenoid valves (DSVs) 122 and 123. The second output pressure line 212 also leads to the 3-4 shift valve 105. The second output pressure line 212 leading to the 3-4 shift valve 105 is brought into communication with the lockup control valve 106 through a pressure line 218 when the 3-4 shift valve 105 has placed the spool in the right-end position; and brought into communication with the fluid chamber of the forward clutch (FWCL) 51 through a forward clutch pressure line 219 when the lockup control valve 106 has placed the spool in the left-end position. A pressure line 220 branching off from the forward clutch pressure line 219 leads to the 3-4 shift valve 105. This pressure line 220 is brought into communication with the first accumulator 141 through the pressure line 210 when the 3-4 shift valve 105 has placed the spool in the left-end position, and on the other hand, is brought into communication with the servo release fluid chamber 54b of the 2-4 brake (2-4BR) 54 through a servo release pressure line 221 when the 3-4 shift valve 105 has placed the spool in the right-end position.

The second duty solenoid valve (DSV) 122 at its downstream side to which a control source pressure is supplied through the second output pressure line 212 leads to a control port of the solenoid relay valve (SRV) 107 through a pressure line 222 and supplies a pilot pressure to the port to force the solenoid relay valve (SRV) 107 to shift its spool toward the left-end position. A pressure line 223 branching off from the pressure line 222 leads to the low-reverse valve 103, and is further brought into communication with a pressure line 224 when the low-reverse valve 103 has placed the spool in the right-end position. A pressure line 225 branching off from the pressure line 224 through an orifice 151 leads to the 3-4 shift valve 105 and is brought into communication with the servo release fluid chamber 54b of the 2-4 brake (2-4BR) 54 through the servo release pressure line 221 when the 3-4 shift valve 105 has placed the spool in the left-end position. A pressure line 226 branching off from the pressure line 225 leads to the bypass valve 104, and is further brought into communication with the fluid chamber of the 3-4 clutch (3-4CL) 53 through a 3-4 clutch pressure line 227 when the bypass valve 104 has placed the spool in the right-end position. Further, the pressure line 224 leads directly to the bypass valve 104, and is brought into communication with the pressure line 225 through the pressure line 226 when the bypass valve 104 has placed the spool in the left-end position. In other words, the pressure lines 224 and 225 are intercommunicated with each other by bypassing the orifice 151.

The third duty solenoid valve (DSV) 123 at the downstream side to which a control source pressure is supplied from the second output pressure line 212 leads the lockup control valve 106 through a pressure line 228, and is brought into communication with the forward clutch pressure line 219 when the lockup control valve 106 has placed the spool in the right-end position. On the other hand, the third duty solenoid valve (DSV) 123 is brought into communication with the front fluid chamber 26a of the lockup clutch 26 through a pressure line 229 when the lockup control valve 106 has placed the spool in the left-end position.

The third output pressure line 213 extending from the manual shift valve 102 leads to the low-reverse valve 103 to supply the line pressure to the low-reverse valve 103. The low-reverse valve 103 directs the line pressure to the fluid chamber of the reverse clutch (RVCL) 52 through a reverse clutch pressure line 230. A pressure line 231 branching off from the third output pressure line 213 leads to the bypass valve 104, and supplies the line pressure as a pilot pressure to the control port of the low-reverse valve 103 through the pressure line 208 when the bypass valve 104 has placed the spool in the right-end position, forcing the low-reverse valve 103 to shift the spool toward the left-end position.

The hydraulic control circuit 100 is provided with a converter relief valve 109 to adjust the hydraulic fluid supplied from the regulator 101 through a pressure line 232 to a fixed level, and then directs the fixed level of hydraulic fluid to the lockup control valve 106 through a pressure line 233. The fixed level of hydraulic fluid is supplied to the front fluid chamber 26a of the lockup clutch 26 through the pressure line 229 when the lockup control valve 106 has placed the spool in the right-end position, and is supplied to the rear fluid chamber 26b through a pressure line 234 when the lockup control valve 106 has placed the spool in the left-end position. This lockup clutch 26 is released when the fixed level of hydraulic fluid is supplied to the front fluid chamber 26a, and is, however, controlled to allow slippage according to the pressure level of hydraulic fluid supplied to the front fluid chamber 26a from the third duty solenoid valve (DSV) 123 when the lockup control valve 106 has placed the spool in the left-end position.

A pressure line 235, which is brought into communication with the main pressure line 200 through the manual valve 102 in each of the drive (D) range, the second (S) range, the low-speed (L) range and the neutral (N) range, leads to a reduction port 101b of the regulator valve 101 to introduce the line pressure to the reduction port 101b in the respective range, so that the line pressure is adjusted to be lower in level in these ranges than in the remaining range, i.e. the reverse (R) range.

Figure 4:
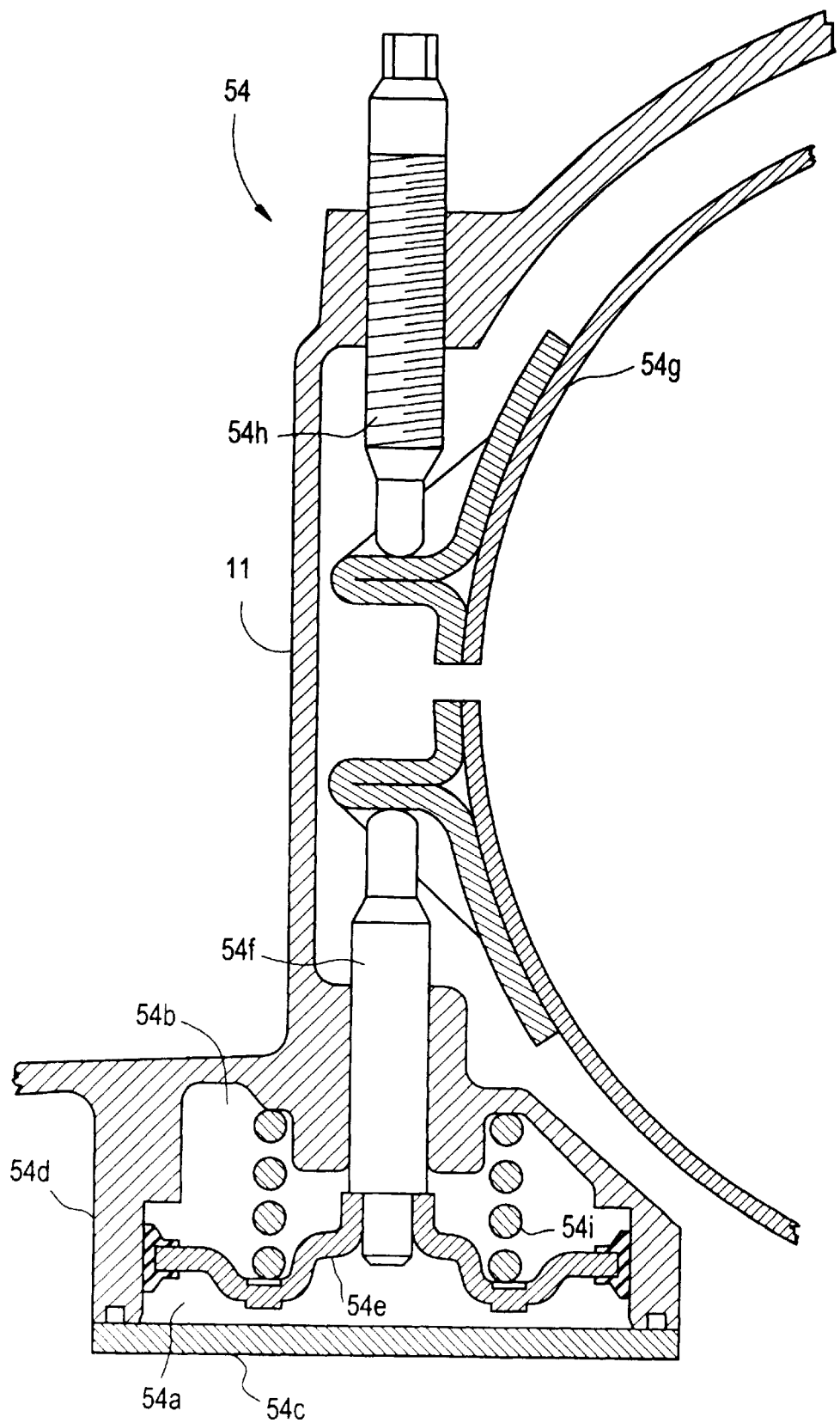
FIG. 4 is a cross-sectional view of a hydraulic actuator for a 2-4 brake.

FIG. 4 shows the structure of a hydraulic actuator of the 2-4 brake (2-4BR) 54 in detail. As shown in FIG. 4, the hydraulic actuator has a servo cylinder 54d and a piston 54e which is received in the servo cylinder 54d and provided with a stem 54f secured thereto. The servo cylinder 54b is comprised of part of the transmission housing 11 and a cover member 54c fixed to the transmission housing 11 to form therein a cylinder chamber which is divided into two sub-chambers by the piston 54e, i.e. the servo apply fluid chamber 54a and the servo release fluid chamber 54b. A brake band 54g, which is wrapped around a brake-receiving member, such as a brake drum, (not shown), has one end against which the piston stem 54f is forced to abut and another end against which a fixed stem 54h fastened to the transmission housing 11 abuts. A spring 54i is installed within the interior of the servo release fluid chamber 54b to force the piston 54e toward the servo apply fluid chamber 54a so as usually to loosen the brake band 54g. The hydraulic fluid is supplied to both or one of the servo apply fluid chamber 54a and the servo release fluid chamber 54b from the hydraulic control circuit 100 to tighten or loosen the brake band 54g, engaging or disengaging the 2-4 brake (2-4BR) 54. In this hydraulic actuator, especially, the piston 54e has nearly equal pressure receiving areas at the side of the servo apply chamber 54a and the side of the servo release fluid chamber 54b and, therefore, when, for example, both fluid chambers 54a and 54b are supplied with an equal level of hydraulic fluid, the piston 54e is activated only by the expanding force of the spring 54i to move toward the servo apply fluid chamber 54a, so as to loosen the band brake 54g.

Figure 5:
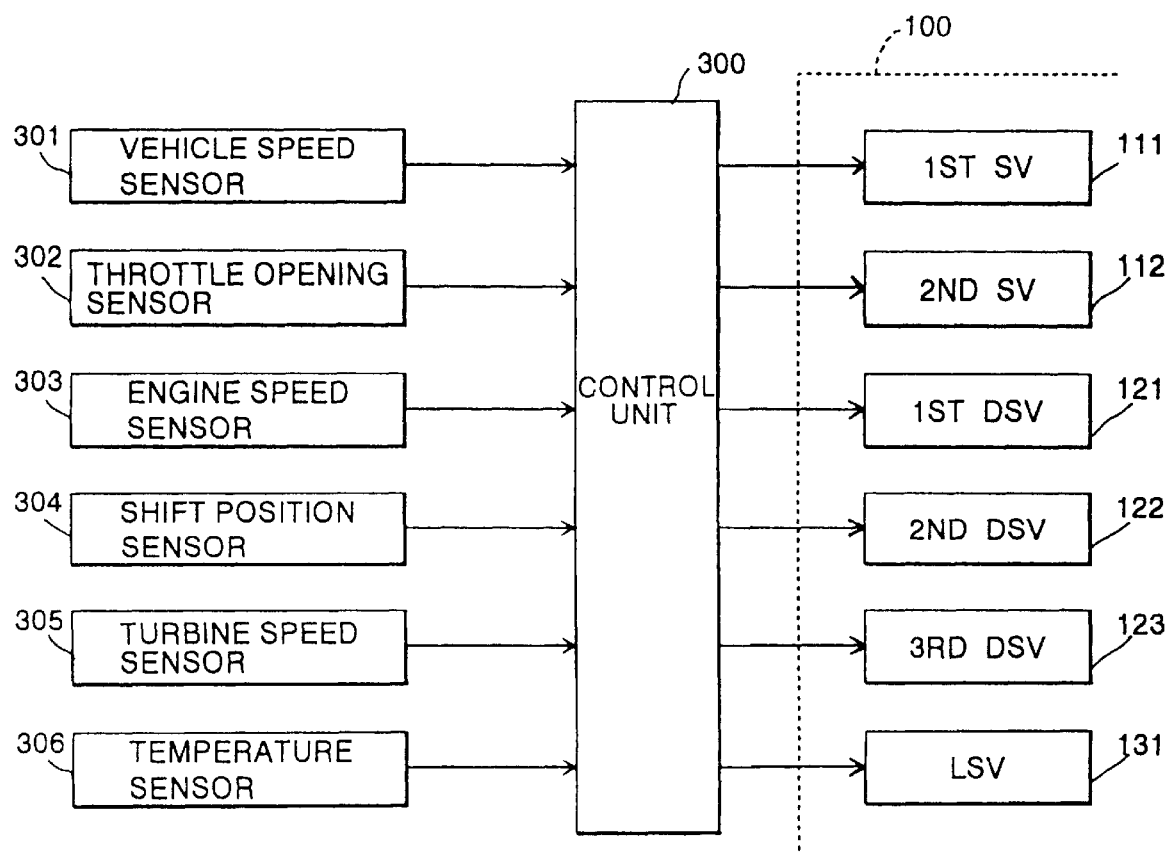
FIG. 5 is a block diagram illustrating a control system of various solenoid valves installed in the hydraulic control circuit.

FIG. 5 shows a control unit 300 provided in the automatic transmission 10 which controls the first and second solenoid valves (SVs) 111 and 112 and the first through third duty solenoid valves (DSVs) 121 through 123 as well as the linear solenoid valve 131. The control unit 300 receives various signals such as a vehicle speed signal from a speed sensor 301, a throttle opening signal from a throttle opening sensor 302, an engine speed signal from an engine speed sensor 303, a transmission position signal from a shift position sensor 304, a turbine speed signal from a turbine speed sensor 305, and a temperature signal from a fluid temperature sensor 306. With these signals, the control unit 300 controls operation of each of these valves 111, 112, 121–123 and 131 according to driving conditions of the vehicle or operating conditions of the engine. Various types of these sensors are well known in the art, and any well known type may be taken. As was previously described, in particular, the turbine speed sensor 305 may be installed as shown in FIG. 2.

The relationship between operation of these first and second solenoid valves (SVs) 111 and 112 and the first to third duty solenoid valves (DSVs) 121 to 123 and supply of the hydraulic fluid to each of the friction coupling elements 51 to 55 is described in each of the possible gears in Table II. In Table II, a mark "○" (circle) in parentheses indicates an ON state in regard to the first and second solenoid valves (SVs) 111 and 112 and, however, an OFF state in regard to the first to third duty solenoid valves (DSVs) 121 to 123, in each state, the valve bringing fluid paths upstream and downstream from the valve into communication to permit a source pressure to directly flow from the upstream path to the downstream path. Also, a mark "X" in parentheses indicates an OFF state in regard to the first and second solenoid valves (SVs) 111 and 112 and an ON state in regard to the first to third solenoid valves (DSVs) 121 to 123, in each both state, the valve draining the hydraulic fluid from the upstream path while shutting off the upstream path.

TABLE II

| RANGE | DRIVE (SECOND) | | | | LOW | REV. |
|---|---|---|---|---|---|---|
| GEAR | 1ST | 2ND | 3RD | 4TH | 1ST | REV. |
| 1ST SV (111) | X | X | X | ○ | ○ | ○ |
| 2ND SV (112) | X | X | X | X | ○ | ○ |
| 1ST DSV (121) | X | ○ | ○ | ○ | ○ | ○ |
| 2ND DSV (122) | X | X | ○ | ○ | X | ○ |
| 3RD DSV (123) | ○ | ○ | ○ | X | ○ | ○ |

Figure 6:
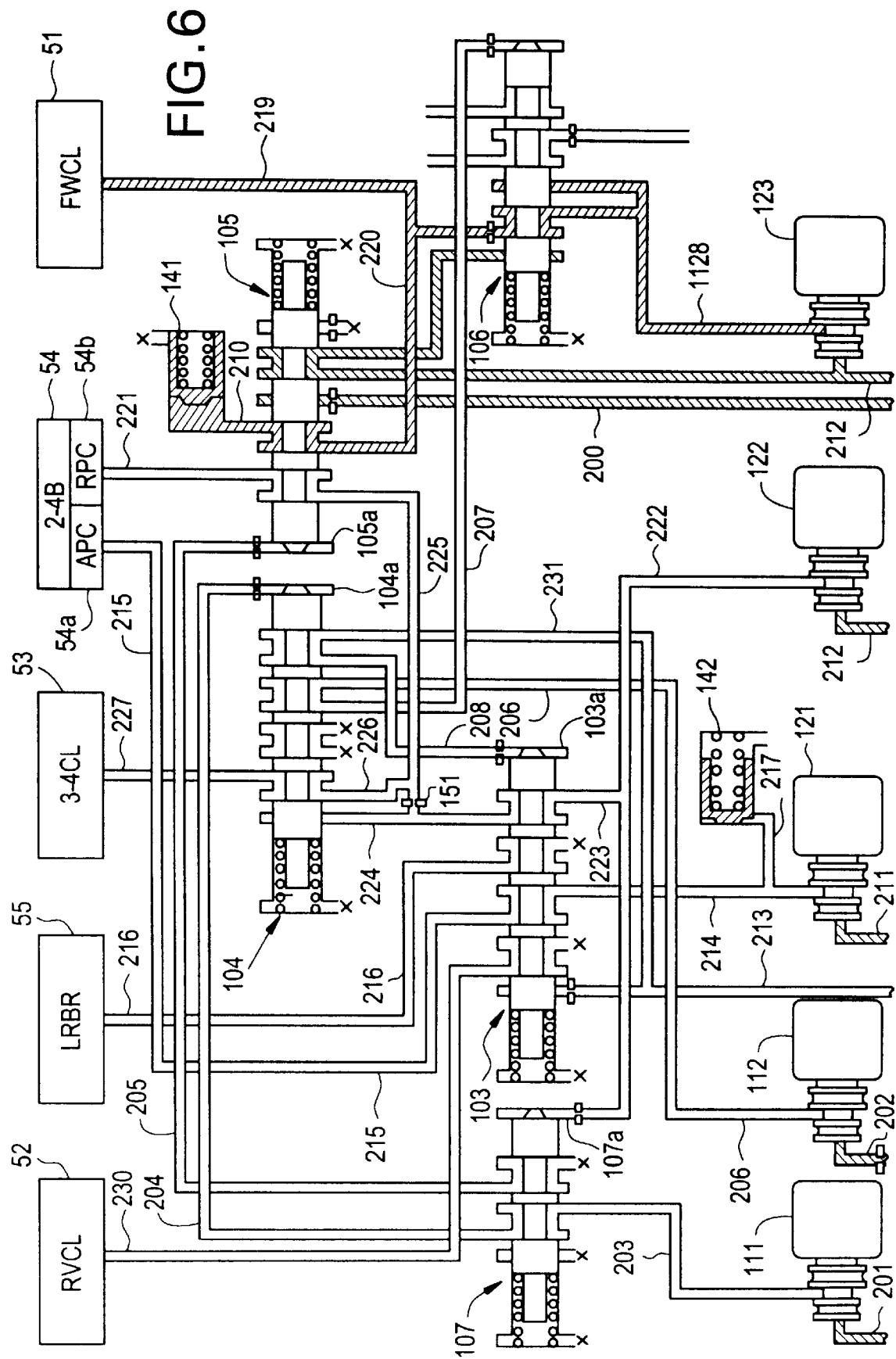
FIG. 6 is an enlarged view of an essential part of the hydraulic control circuit of FIG. 3 which is in a state for a first gear.

As shown in FIG. 6 and indicated in Table II, for the first (1ST) gear in the forward ranges excepting the low-speed (L) range, only the third duty solenoid valve (DSV) 123 operates to generate hydraulic fluid pressure from the line pressure as a source pressure from the second output pressure line 212. This hydraulic fluid is supplied to the lockup control valve 106 through this instance, because the pressure line 220 branching off from the forward clutch pressure line 219 has been brought into communication with the first accumulator 141 through the pressure line 210 via the 3-4 shift valve 105, the forward clutch hydraulic pressure is supplied smoothly.

Figure 7:
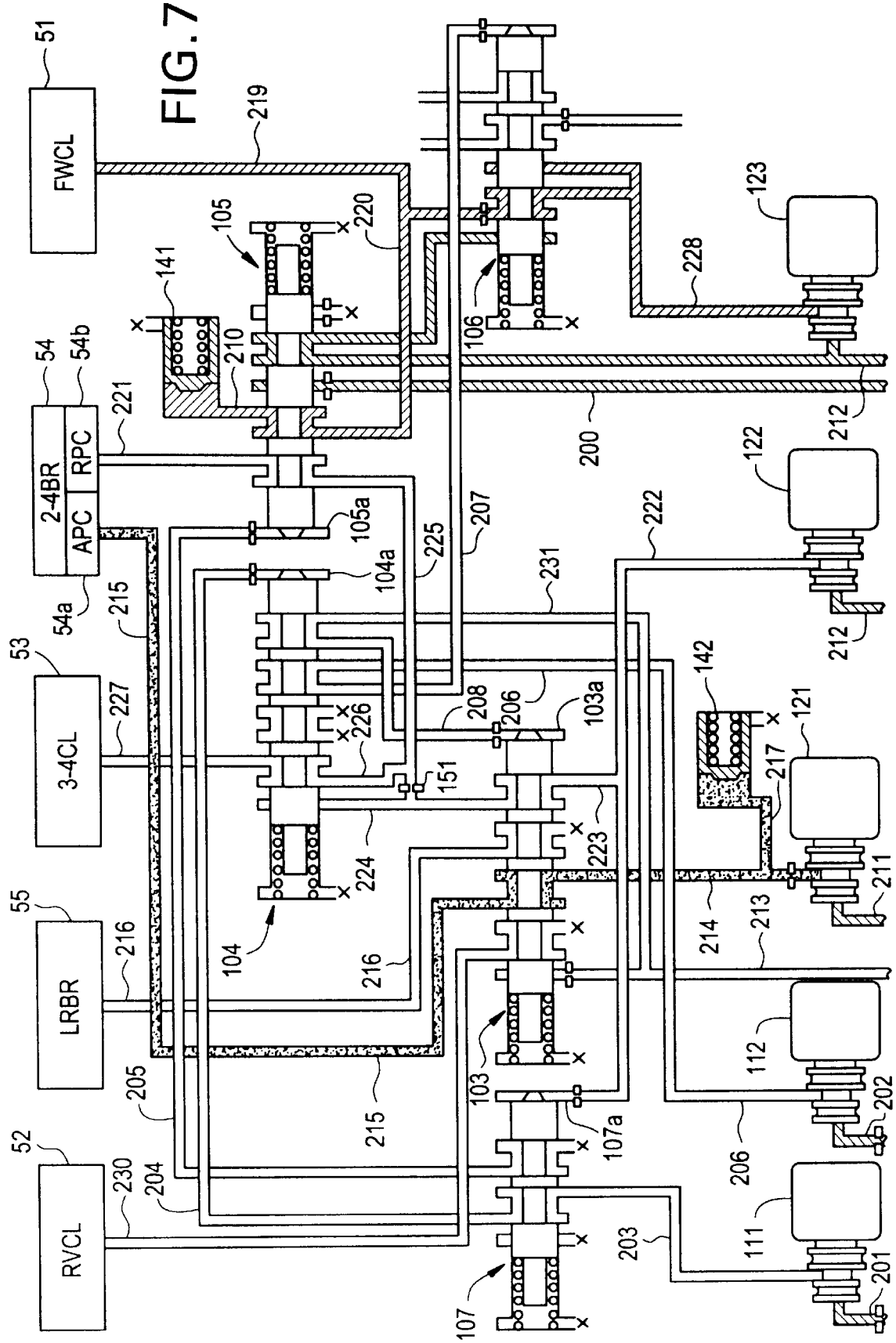
FIG. 7 is an enlarged view of an essential part of the hydraulic control circuit of FIG. 3 which is in a state for a second gear.

For the second (2ND) gear, as shown FIG. 7 and indicated in Table II, in addition to the third duty solenoid valve (DSV) 123 locked in the first (1ST) gear, the first duty solenoid valve (DSV) 121 operates to generate a hydraulic fluid pressure from the line pressure as a source fluid pressure from the first output pressure line 211. This hydraulic fluid is supplied to the low-reverse valve 103, and at this time, because the low-reverse valve 103 has placed the spool in the right-end position, the hydraulic fluid is directed into the servo apply pressure line 215, and then supplied to the servo apply fluid chamber 54a of the 2-4 brake (2-4BR) 54 and applying or engaging the 2-4 brake (2-4BR) 54, while the forward clutch (FWCL) 51 is released or disengaged. In this instance, because the pressure line 214 leads to the second accumulator 142 through the pressure line 217, it is gentle to supply the servo apply pressure line 215, and hence to engage the 2-4 brake (2-4BR) 54. The hydraulic fluid accumulated in the accumulator 142 is pre-charged to the fluid chamber of the low-reverse brake (LRBR) 55 through the low-reverse brake pressure line 216 when the low-reverse valve 103 shifts the spool toward the left-end position during a gear shift to the first (1ST) gear in the low-speed (L) range, as will be described later.

Figure 8:
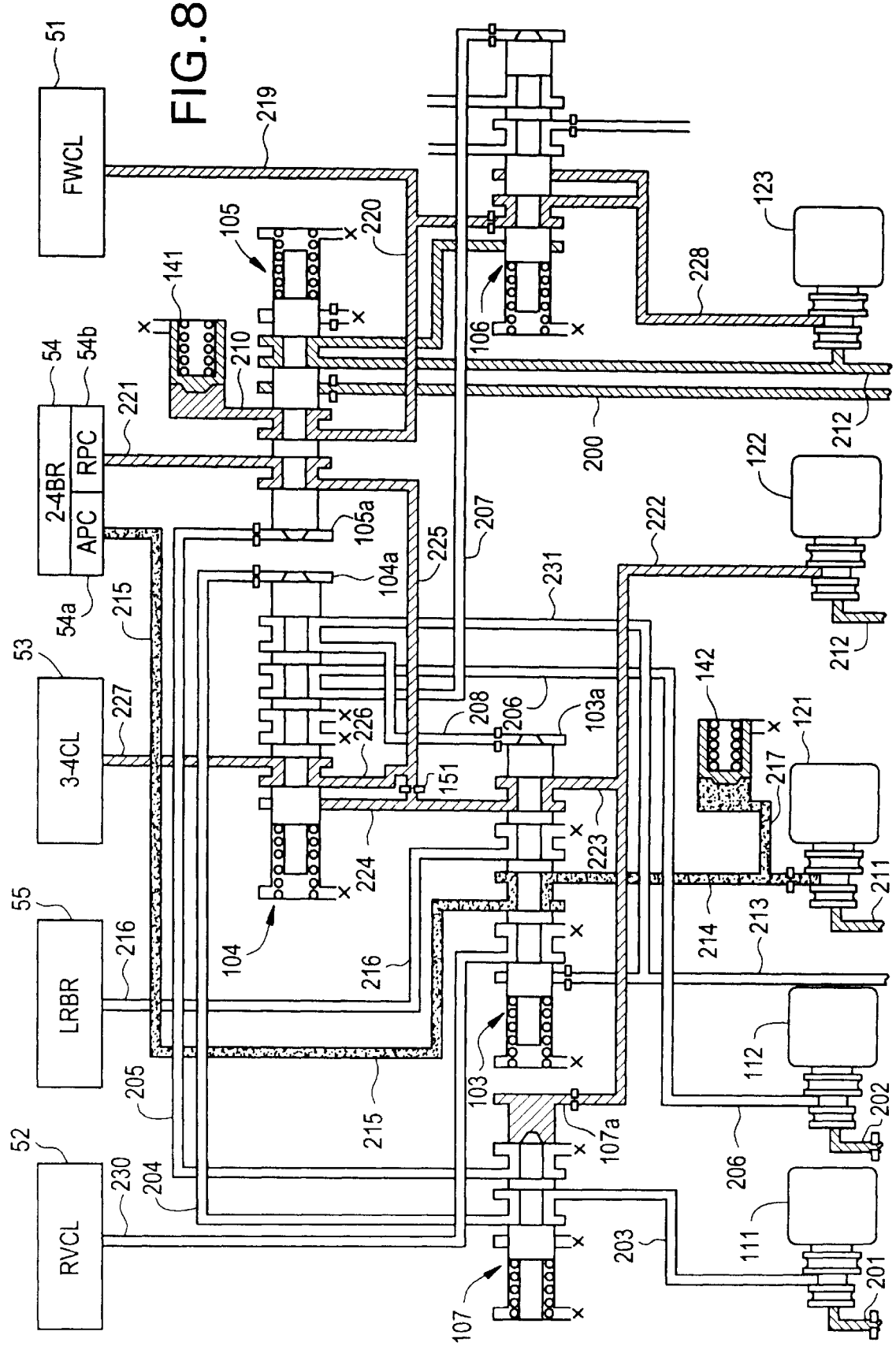
FIG. 8 is an enlarged view of an essential part of the hydraulic control circuit of FIG. 3 which is in a state for a third gear.

For the third (3RD) gear, as shown FIG. 8 and indicated in Table II, while the first and second solenoid valves (SVs) 111 and 112 and the first and third duty solenoid valves (DSVs) 121 and 123 remains in the state of the second (2ND) gear, the second duty solenoid valve (DSV) 122 operates to generate a hydraulic fluid pressure from the line pressure as a source pressure supplied from the second output pressure line 212. This hydraulic fluid is supplied to the low-reverse valve 103 through the pressure lines 222 and 223, and then, because the low-reverse valve 103 still remains the spool in the right-end position, directed to the pressure line 224. As a result, the hydraulic fluid is introduced into the pressure line 225 through the orifice 151 from the pressure line 224, and then to the 3-4 shift valve 105. At this time, because the 3-4 shift valve 105 has placed the spool in the left-end position, the hydraulic fluid is further directed as a servo release pressure to the servo release fluid chamber 54b of the 2-4 brake (2-4BR) 54 through the servo release pressure line 221. Consequently, the 2-4 brake (2-4BR) 54 is disengaged or released. On the other hand, the hydraulic fluid is directed to the bypass valve 104 through the pressure line 226 branching off from the pressure line 225 after the orifice 151. At this time, because the bypass valve 104 has been placed the spool in the right-end position, the hydraulic fluid is also supplied as a 3-4 clutch pressure to the fluid chamber of the 3-4 clutch (3-4CL) 53 through the 3-4 clutch pressure line 227. In this way, while the 2-4 brake (2-4BR) 54 is disengaged, both forward clutch (FWCL) 51 and 3-4 clutch (3-4CL) 53 are engaged. In this instance, in the sate of operation of the valves for the third (3RD) gear, the second duty solenoid valve (DSV) 122 generates the hydraulic fluid, as was previously described, and supplies it to the relay valve 107 at the control port 107a through the pressure line 222 to force the relay valve 107 to shift the spool to the left-end position.

Figure 9:
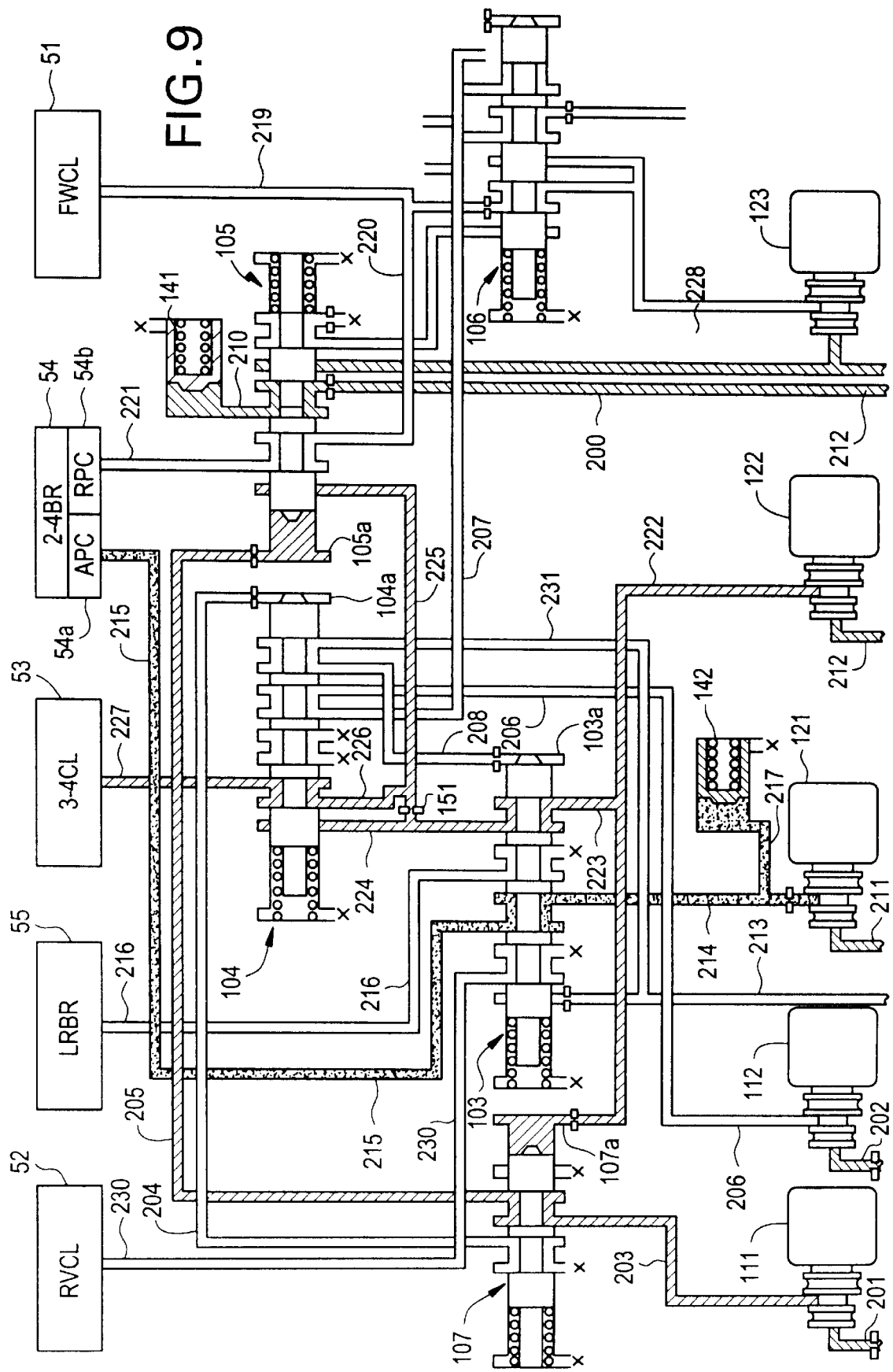
FIG. 9 is an enlarged view of an essential part of the hydraulic control circuit of FIG. 3 which is in a state for a forth gear.

For the forth (4TH) gear, as shown in FIG. 9 and indicated in Table II, while the valves 112, 121 and 122 remain in the same state of operation as for the third (3RD) gear, the third duty solenoid valve (DSV) 123 stops the generation of hydraulic fluid pressure, and, on the other hand, the first solenoid valve (SV) 111 operates. Consequently, the first solenoid valve (SV) 111 supplies the fixed level of hydraulic fluid to the relay valve 107 from the pressure line 201 through the pressure line 203. At this time, because the relay valve 107 has placed the spool in the left-end position for the third (3RD) gear, it directs the fixed level of hydraulic fluid to the 3-4 shift valve 105 at the control port 105a through the pressure line 205, forcing the 3-4 shift valve 105 to shift the spool to the right-end position, so that the servo release pressure line 221 is brought into communication with the pressure line 220 branching off from the forward clutch pressure line 219 to put the releasing chamber 54b of the 2-4 brake (2-4BR) 54 and the fluid chamber of the forward clutch (FWCL) 51 intercommunicated with each other.

By means of putting the third duty solenoid valve (DSV) 123 inoperative to stop the generation of hydraulic fluid pressure and drain the hydraulic fluid from the downstream path from the third duty solenoid valve (DSV) 123, while the servo release hydraulic fluid is drained from the releasing chamber 54b of the 2-4 brake (2-4BR) 54 through the pressure line 228 via the lockup control valve 106, to engage the 2-4 brake (2-4BR) 54 again, and the forward clutch apply hydraulic fluid is drained from the fluid chamber of the forward clutch (FWCL) 51 through the pressure line 228 via the lockup control valve 106 to unlock the forward clutch (FWCL) 51.

Figure 10:
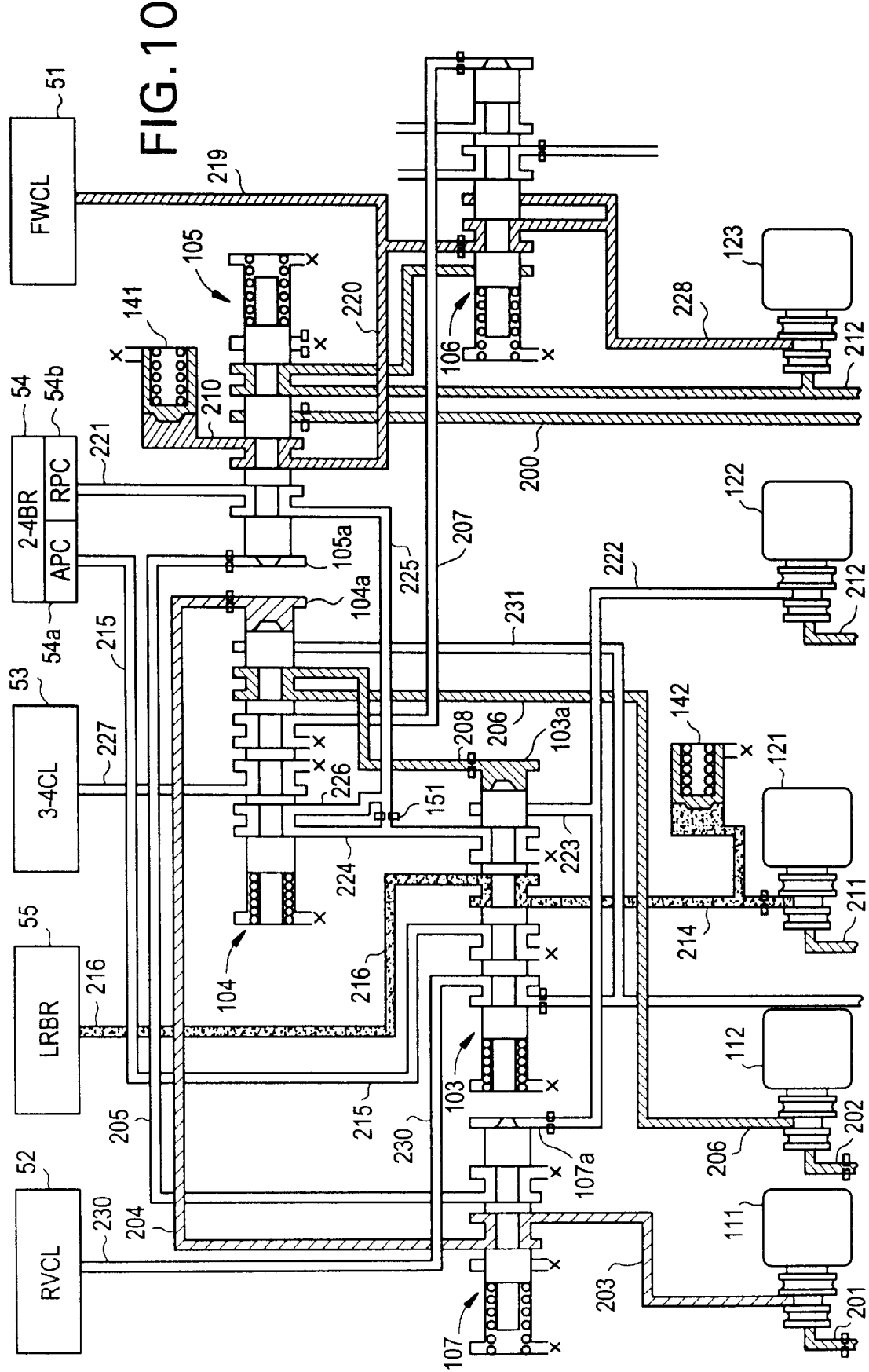
FIG. 10 is an enlarged view of an essential part of the hydraulic control circuit of FIG. 3 which is in a state for the forth gear in a low-speed (L) range.

For the first (1ST) gear in the low-speed (L) range, as shown in FIG. 10 and indicated in Table II, the first and second solenoid valves (SVs) 111 and 112, and the first and third duty solenoid valves (DSVs) 121 and 123 operate to supply the hydraulic fluid pressure generated by way of the third duty solenoid valve (DSV) 123 as a forward clutch apply pressure to the fluid chamber of the forward clutch (FWCL) 51 through the pressure line 228 and forward clutch pressure line 219 via the lockup control valve 106 in a similar way for the first (1ST) gear, for example, in the drive (D) range. In this manner, the forward clutch (FWCL) 51 is applied with the hydraulic fluid to engage. At this time, due to accumulation of the hydraulic fluid in the first accumulator 141 through the pressure lines 210 and 220 via the 3-4 shift valve, the forward clutch (FWCL) 51 is engaged smoothly.

By means of the operation of the first solenoid valve (SV) 111, the bypass valve 104 at the control port 104a is supplied with a pilot pressure through the pressure lines 203 and 204 via the relay valve 107 to shift the spool to the left-end position, which is followed by introduction of the hydraulic fluid into the pressure line 208 through the pressure line 206 via the bypass valve 104, forcing the low reverse valve 103 to shift the spool to the left-end position. Consequently, the hydraulic fluid pressure at the first duty solenoid valve (DSV) 121 is supplied as a low-reverse brake apply pressure to the fluid chamber of the low-reverse brake (LRBR) 55 through the low-reverse brake pressure line 216 the low-reverse valve 103, by which, while the forward clutch (FWCL) 51 is engaged, the low-reverse brake (LRBR) 55 is engaged, providing the first (1ST) gear where engine brake is available.

Figure 11:
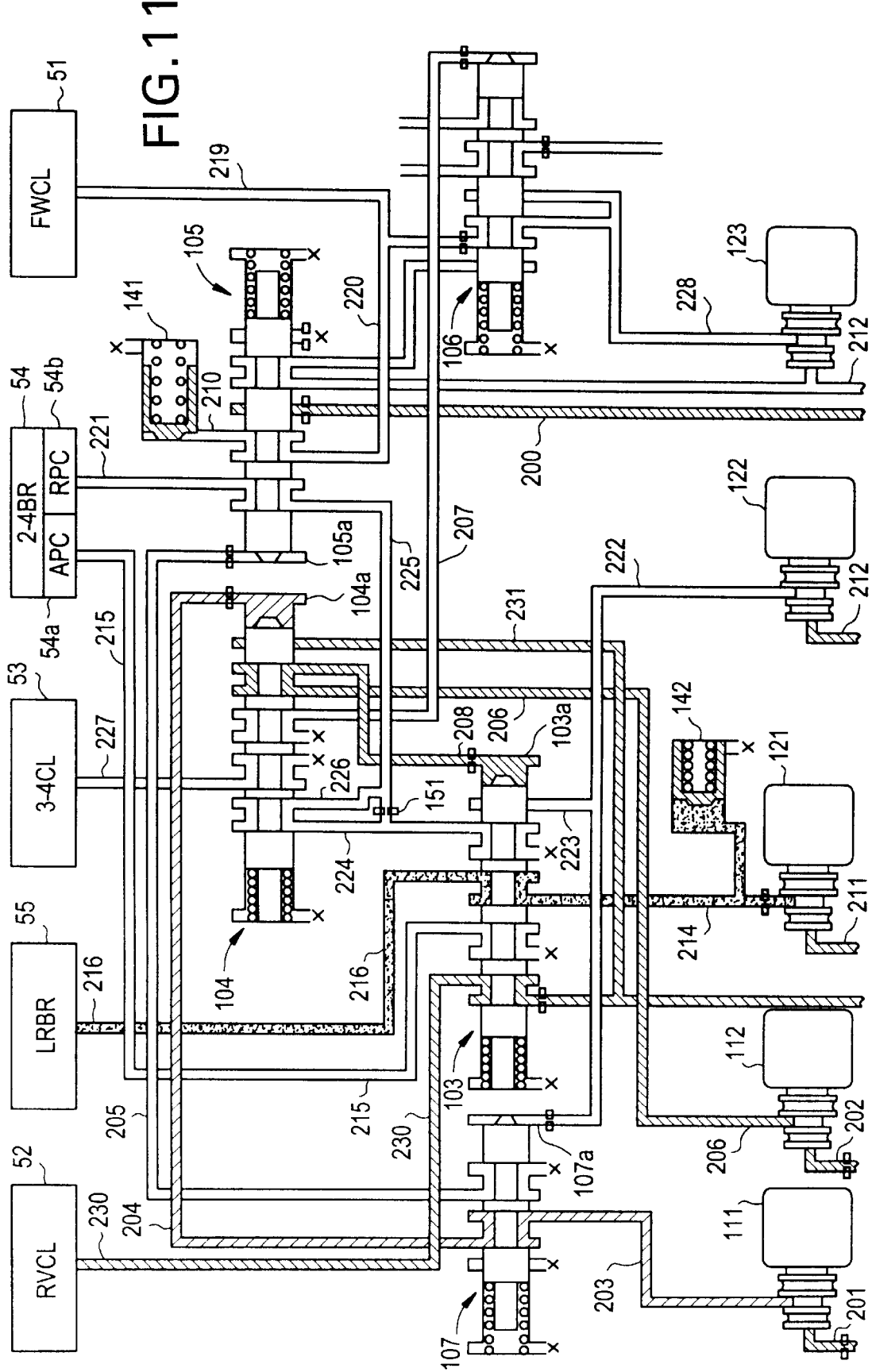
FIG. 11 is an enlarged view of an essential part of the hydraulic control circuit of FIG. 3 which is in a state for a reverse gear

In the reverse (R) range, as shown in FIG. 11 and indicated in Table II, all of the valves 111 and 112, and 121 to 123 operate. In this state, the second and the third duty solenoid valves (DSVs) 122 and 123 do not generate any hydraulic fluid pressure due to interruption of supply of the source pressure thereto from the second output pressure line 212. As was described, because the first and second solenoid valves (SVs) 111 and 112 operate, the bypass valve 104 shifts the spool to the left-end position similarly for the first (1ST) gear in the low-speed (L) range, which is followed by forcing the-low reverse valve 103 to shift the spool to the left-end position. Under this circumstance, the hydraulic fluid pressure generated at the first duty solenoid valve (DSV) 121 is supplied as the low-reverse brake apply pressure to the fluid chamber of the low-reverse brake (LRBR) 55. In the reverse (R) range, the line pressure is introduced into the third output pressure line 213 from the manual shift valve 102, and is directed as a reverse clutch apply pressure to the fluid chamber of the reverse clutch (RVCL) 53 through the reverse clutch pressure line 230 via the low-reverse valve 103 with the spool shifted to the left-end position. Consequently, the reverse clutch (RVCL) 52 and the low reverse brake (LRBR) 55 are engaged. In this instance, the line pressure is introduced into the third output pressure line 213 from the manual valve 102 even in the neutral (N) range, engaging the reverse clutch (RVCL) 52 in the neutral (N) range when the low reverse valve 103 has placed the spool to the left-end position.

The following description is directed to gear shifts, in particular 3-2 and 3-4 shifts for which hydraulic fluid supply and discharge changes 54a and 54b from a state in which hydraulic fluid is supplied to both servo apply and servo release chambers of the 2-4 brake to a state in which the hydraulic fluid in the servo release chamber 54b is discharged.

A torque demand 3-2 shift following an increase in engine load and a manual 3-2 shift with the engine remaining loaded will be described hereafter.

Figure 12:
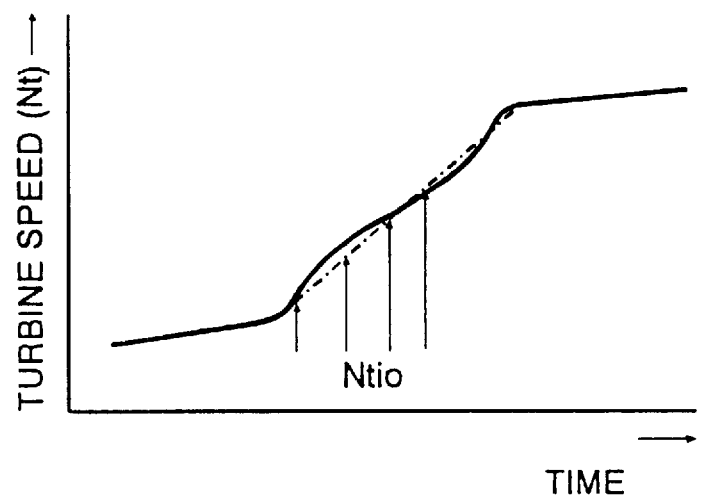
FIG. 12 is an explanatory diagram for feedback control of the turbine speed during a down shift.

A 3-2 down shift such as a torque demand 3-2 down shift is achieved by disengaging the 3-4 clutch 53 simultaneously with engaging the 2-4 brake 54. In the hydraulic control circuit as shown in FIG. 8, while the first servo valve (SV) 111 is turned off to cause the 3-4 shift valve 105 to bring the servo release pressure line 221 and the 3-4 clutch pressure line 227 in communication with each other, the second duty solenoid valve (DSV) 122 is controlled to discharge hydraulic flied from the servo release chamber 54b of the 3-4 brake and the fluid chamber of the 3-4 clutch 53. During this control, the feedback control is conducted to provide a satisfactory increase in turbine speed. Fort the control, the 3-4 clutch 53 is precedingly disengaged, so that it slips to create an inertia phase, assisting the turbine to increase its speed of rotation Nt as shown in FIG. 12. At a point of time by which the turbine increases its speed near the target speed Nto, the 2-4 brake 54 is engaged to create a torque phase. Practically, during the torque demand gear shift, the hydraulic fluid released from the 3-4 clutch 53 is controlled to remain even-level so as to bring the turbine speed Nt in the inertia phase coincident to an instantaneous target turbine speed Ntio. The control of even-level hydraulic fluid is achieved by controlling servo apply fluid by means of the first duty solenoid valve (DSV) 121.

Specifically, as shown in FIG. 3, by means of action of the orifice 151 which is disposed upstream from the pressure line 225 leading to the servo release pressure line 221 and the pressure line 226 leading to 3-4 clutch 227 both of which branch off from the pressure line 224 extending from second duty solenoid valve (DSV) 122, pressure of the servo release hydraulic fluid and the 3-4 clutch apply hydraulic fluid is controlled not by the second duty solenoid valve (DSV) 122 but by pressure of the servo apply hydraulic fluid in the servo apply fluid chamber 54a separated from the servo release fluid chamber 54b by the piston 54e of the servo cylinder 54d. The second duty solenoid valve 122 regulate the flow amount of hydraulic fluid discharged from the fluid chamber of the 3-4 clutch 53 and the servo release fluid chamber 54b of the 2-4 brake 54 through the orifice 151 to regulate the difference in pressure between the servo apply fluid chamber 54a and the servo release fluid chamber 54b so as to control the hydraulic fluid released from the 3-4 clutch 53 at an even-level. Accordingly, during the torque command 3-2 shift, while the first duty solenoid valve (DSV) 121 controls the even-level hydraulic fluid released from the 3-4 clutch 53 through servo apply pressure, the second duty solenoid valve (DSV) 122 controls the pressure difference between servo apply hydraulic fluid and servo release hydraulic fluid as described below.

Figure 13:
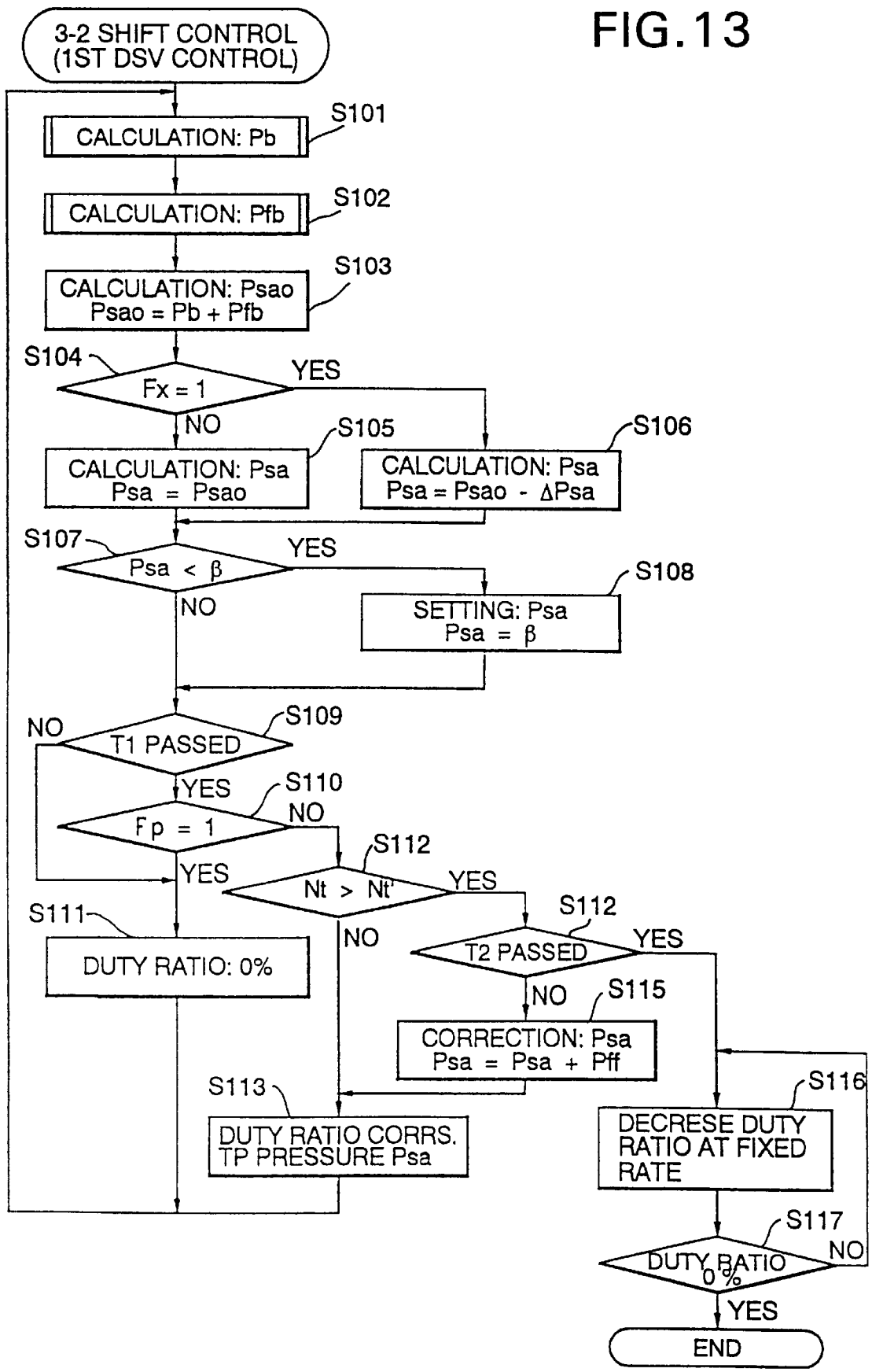
FIG. 13 is a flowchart illustrating the main routine of the first duty solenoid control (DSV) during a 3-2 down shift of the control system according to an embodiment of the invention.

The control of even-level hydraulic fluid is accomplished following the flow chart shown in FIG. 13.

When the flow chart logic commences and control passes to function blocks at steps S101 and S102 where a base pressure Pb and a feedback pressure Pfb are calculated, respectively. The calculation of these base pressure Pb and feedback pressure Pfb will be described. Subsequently to the calculations of base pressure Pb and feedback pressure Pfb, a basic pressure Psao is calculated by adding the base pressure Pb and the feedback pressure Pfb together at step S103.

At step S104, it is determined whether or not a low load flag Fx has been set up to "1. " This low load flag Fx is set up to "1" in a low load region where servo release pressure Psr (the calculation of which will be described later) is lower than a specified value a and reset down to "0" in a intermediate or ordinary load region and a high load region. If the 3-2 shift takes place in the intermediate load region or the high load region, i.e. the low load flag Fx is down, then, the basic pressure Psao is taken as a servo apply pressure Psa at step S105. On the other hand, if the 3-2 shift takes place in the low load region, i.e. the low load flag Fx is up, then, a servo apply pressure Psa is calculated by subtracting a specified value ΔPsa from the basic pressure Psao at step S106. At step S107, if the servo apply hydraulic pressure Psa is lower than its a lower limit β, it is substituted by the lower limit β of servo apply pressure at step S108.

Subsequently, a determination is made at step S109 as to whether a specified delay time T1 has passed immediately after an occurrence of the gear shift command. After the delay time T1 has passed, it is determined whether a precharge flag Fp has been set up to "1." As will be described later, this precharge flag Fp indicates that it is within a precharge period when it is up. Until the delay time T1 passes, or in the precharge period after passage of the delay time T1, the first duty solenoid valve (DSV) 121 is held to operate at a duty ratio of 0% at step S111 so as to precharge hydraulic fluid in the servo apply fluid chamber 54a of the 2-4 brake 54. As a result, the piston 54e is accelerated to shift in a direction in which the servo cylinder 54 activates the 2-4 brake to engage. After the specified delay time T1 has passed, i.e. the precharge flag Fp is down, it is determined at step S112 whether or not the turbine speed Nt has rached a before shift-end turbine speed Nto' (see FIG. 21) slightly lower than a shift-end speed Nto. Before reaching the before shift-end turbine speed Nto', the first duty solenoid valve (DSV) 121 is operated at a duty ratio corresponding to the servo apply pressure Psa calculated at step S105, S106 or S108 to perform the feedback control of servo apply pressure. Due to a decline in the 3-4 clutch apply pressure through the feedback control, the inertia phase is initiated to cause an increase in turbine speed Nt.

When the turbine speed Nt reaches the before shift-end turbine speed Nto', a determination is made at step S114 as to whether a specified time T2 has passed. Until a lapse of the specified time T2, the servo apply pressure Psa is corrected by an addition of a specified feedforward control value Pff. Thereafter, at step S113, the first duty solenoid valve (DSV) 121 is operated at a duty ratio corresponding to the servo apply hydraulic pressure Psa after correction. After the specified time T2 has passes, the duty ratio is decreased at a fixed rate until reaching to 0% through steps S116 and S117.

Figure 14:
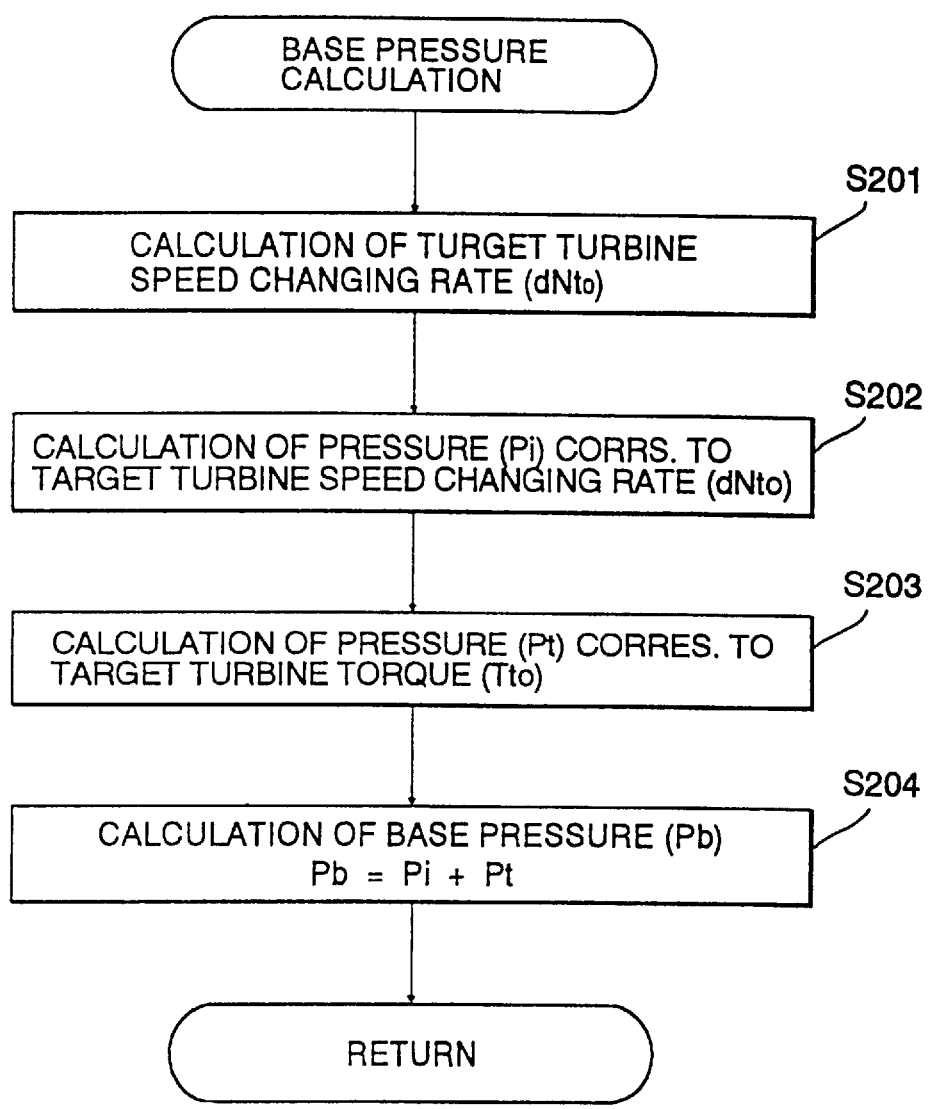
FIG. 14 is a flowchart illustrating the sequence routine of base hydraulic fluid pressure calculation performed during the 3-2 down shift.

The calculation of the base pressure Pb which occurs at step S101 of the sequence routine in the flow chart shown in FIG. 13 is accomplished following the base pressure calculation sequence routine shown by a flow chart in FIG. 14.

Figure 15:
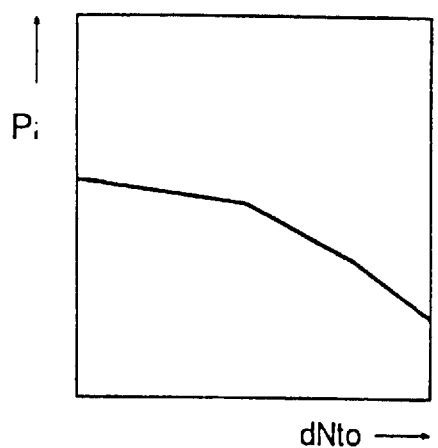
FIG. 15 is a control map of hydraulic fluid pressure with respect to target turbine speed change rate used in the base hydraulic fluid pressure calculation.
Figure 16:
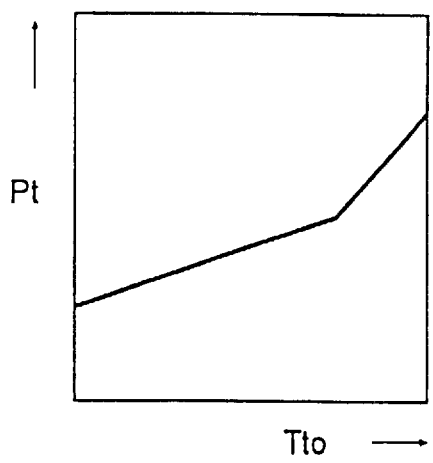
FIG. 16 is a control map of hydraulic fluid pressure with respect to target turbine torque used in the base hydraulic fluid pressure calculation.

At step S201, a target turbine speed change rate $dNt_0$ during the gear shift is calculated, and then, at step S202, a pressure Pi corresponding to the target turbine speed change rate $dNt_0$ is read from a map such as pressure shown in FIG. 15 in which the pressure Pi is set to become lower as the target turbine speed change ratio $dNt_0$ becomes greater. Subsequently, at step S203, a base pressure Pt corresponding to the target turbine torque $Tt_0$ is obtained from a pressure map such as shown in FIG. 16 in which the pressure Pt is set to become higher as the target turbine torque $Tt_0$ becomes greater for the purpose of accelerating releasing of the 3-4 clutch 53. Finally, at step S204, the base pressure Pb is calculated by adding these pressures Pi and Pt.

Figure 17:
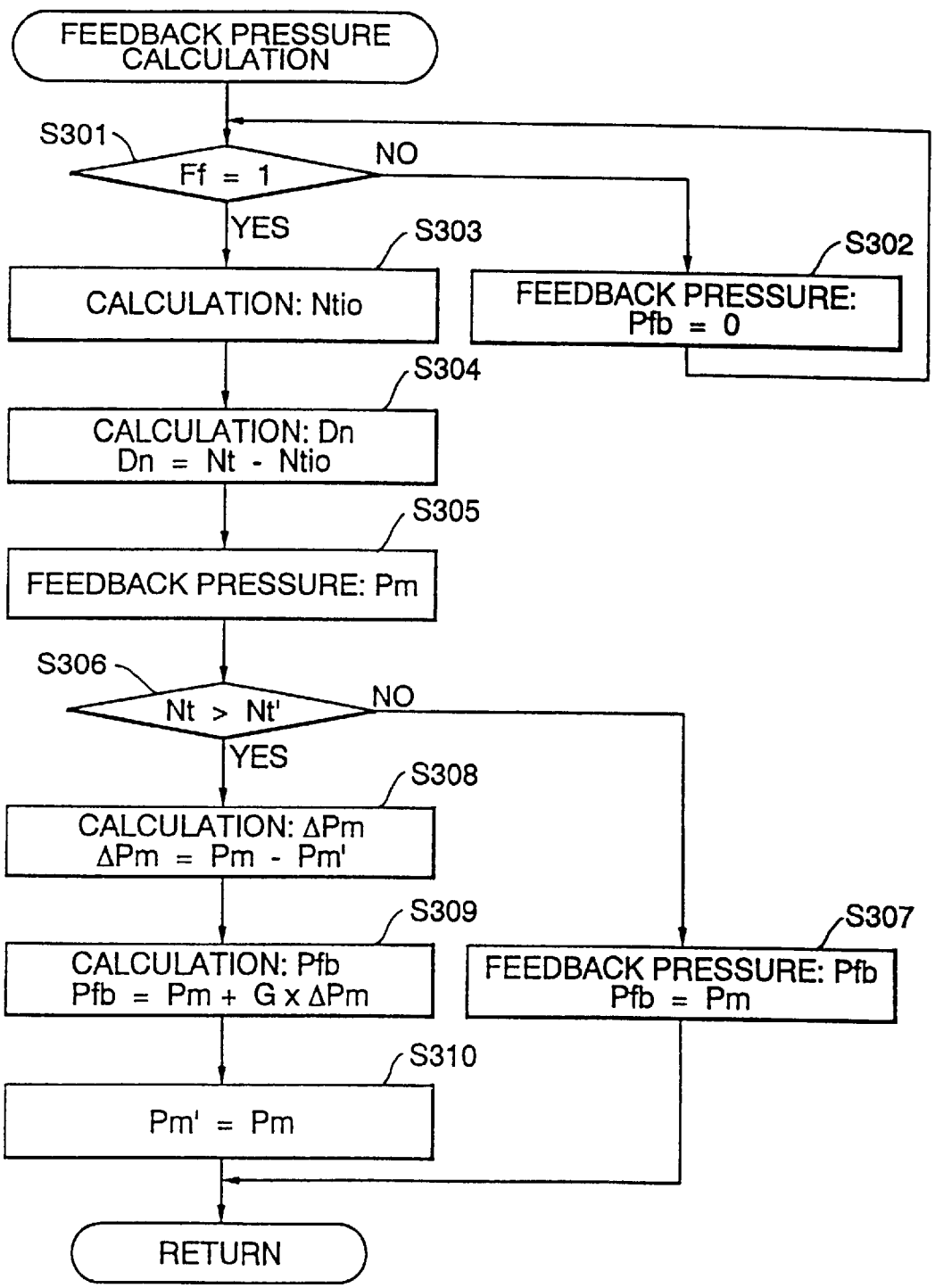
FIG. 17 is a flowchart illustrating the sequence routine of feedback pressure calculation during the 3-2 down shift.

The calculation of the feedback pressure Pfb made at step S2 of the sequence routine shown in FIG. 13 is accomplished following the feedback pressure calculation sequential routine shown by a flow chart in FIG. 17.

Figure 18:
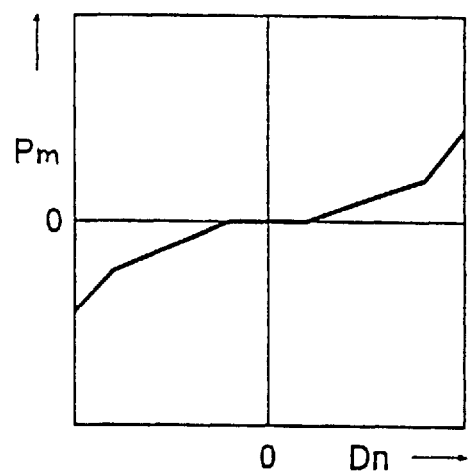
FIG. 18 is a gain control map used in the feedback pressure calculation.

The flow chart logic commences and control passes directly to a function block T401 where a determination is made as to the state of a feedback control flag Ff which indicates whether or not a specified feedback control commencement condition has been satisfied. The feedback pressure Pfb is maintained at a level of 0 at step S302 until the feedback control commencement condition has been satisfied, i.e. until the feedback control flag Ff has been set up to "1". When the feedback control flag Ff has been set up to "1" as a result of attainment of the feedback control commencement condition, a calculation is made based on an optimum shift time specified beforehand in consideration of a durability depending upon of the difference between turbine speeds before and after the gear shift and the thermal capacity and allocated torque of a friction coupling element to find a current target turbine speed $Nti_0$ in each control cycle (see FIG. 12) at step S303. Subsequently to a calculation of a deviation Dn (i.e. $Nt-Nti_0$) of an actual turbine speed Nt from the target turbine speed $Nti_0$ at step S304, a feedback pressure Pm for the speed deviation Dn is read from a pressure map such as shown in FIG. 18 at step S305. In this pressure map, the feedback pressure Pm, i.e. feedback hydraulic fluid pressure Pfb, is set as a positive pressure for a positive nnspeed deviation Dn and as a negative pressure for a negative deviation Dn. The level of the feedback pressure is set to become higher as the absolute value of the deviation Dn become greater. Accordingly when the turbine speed Nt is greater than a target turbine speed $Nti_0$, the servo apply pressure or the 3-4 clutch apply pressure is high to suppress releasing the 3-4 clutch 53, and, conversely when the turbine speed Nt is greater than a target turbine speed $Nti_0$, the servo apply pressure or the 3-4 clutch apply pressure is low high to accelerate releasing the 3-4 clutch 53.

Until the before shift-end turbine speed Nt' is exceeded by the turbine speed Nt at step S306, the feedback pressure Pm read from the map is employed as the feedback pressure Pfb at step S307. On the other hand, when the before shift-end turbine speed Nt' is exceeded by the turbine speed Nt at step S306, after calculating a pressure difference _Pm between a previous and the present feedback pressure Pm read from the map at step S308, a feedback pressure Pfb is calculated by adding to the present feedback pressure the pressure difference multiplied by a specified value G. The previous map pressure Pm' is replaced with the present map feedback pressure Pm for another feedback pressure calculation at step S310. Through this calculation, at a point of time at which the turbine speed Nt reaches up to a before shift-end turbine speed, the gain in the servo apply pressure feedback control is increased.

Figure 21:
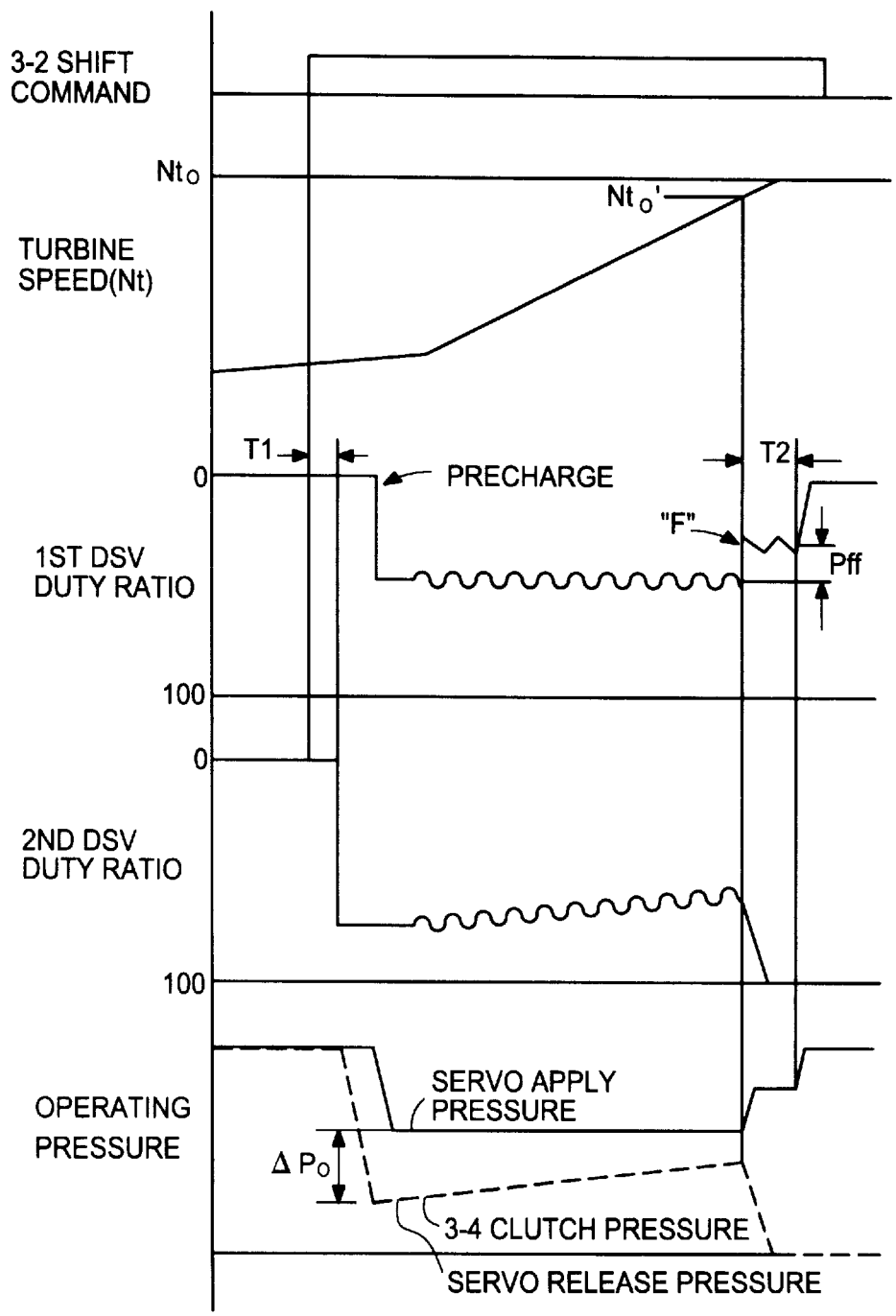
FIG. 21 is a time chart illustrating operation of controlled elements during the 3-2 down shift.

Through the control of the first duty solenoid valve (DSV) 121, the servo apply pressure is controlled in the high load region during the low load flag Fx remaining up as shown in FIG. 21.

Figure 19:
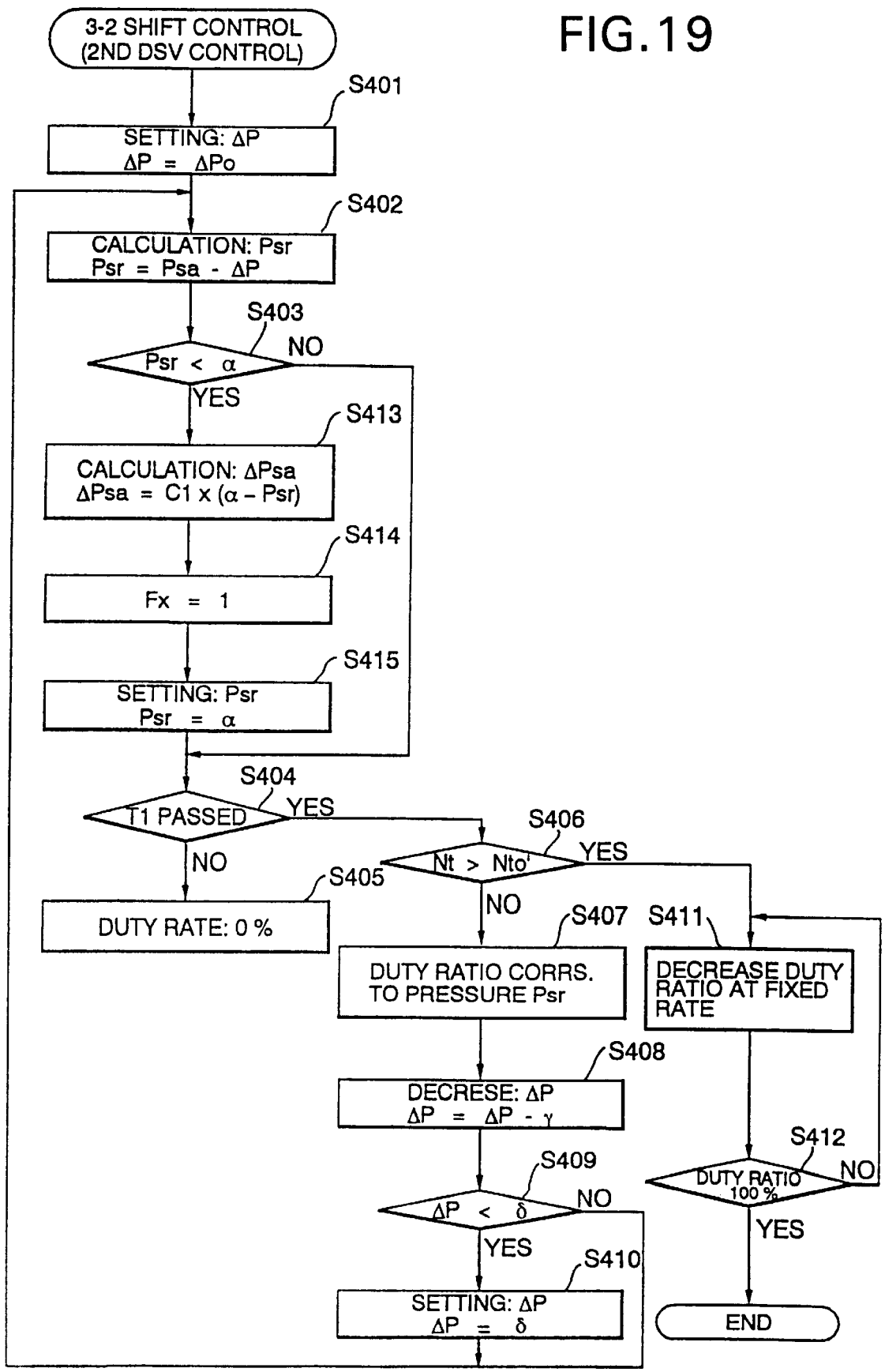
FIG. 19 is a flowchart illustrating the sequence routine of the control of second duty solenoid valve (DSV) during the 3-2 down shift.

The control of discharging of servo release pressure and 3-4 clutch apply pressure by means of the second duty solenoid valve (DSV) 122 is accomplished following the flow chart shown in FIG. 19.

Figure 20:
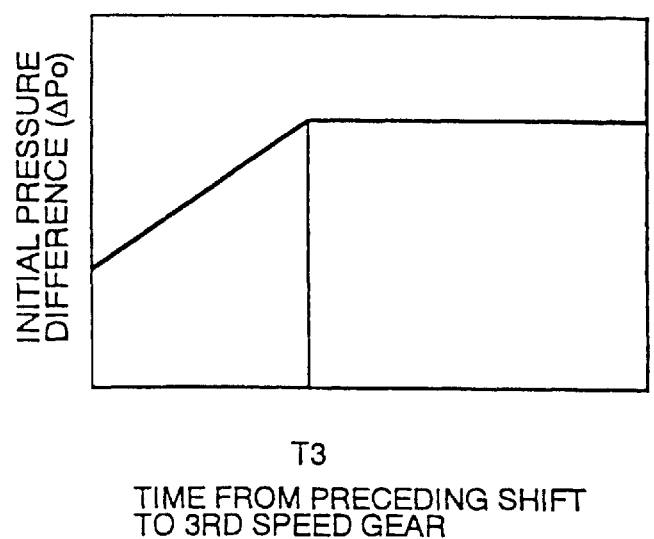
FIG. 20 is an initial pressure difference map used in the feedback pressure calculation.

When the flow chart logic commences and control passes to function blocks at step S401 where a base pressure Pb and the pressure difference _P is set to an initial pressure difference _Po read from a difference pressure map shown in FIG. 20. The servo release pressure Psr is obtained by decreasing the calculated servo apply pressure Psa by the pressure difference _P at step S402. When the servo release pressure Psr is higher than the specified value α at step S403, this indicates that the engine is operating in the high or the intermediate load region, a determination is made at step S404 as to whether the delay time T1 has passed. Until the delay time T1 passes, the second duty solenoid valve (DSV) 122 is held to operate at a duty ratio of 0% at step S405. After the delay time T1 has passed, it is determined at step S112 whether or not the turbine speed Nt has rached a before shift-end speed Nto'. Before reaching the before shift-end speed Nto', while controlling the hydraulic fluid released from the 3-4 clutch 53 to remain even-level by means of the first duty solenoid valve (DSV) 121, a control signal indicating the duty ratio corresponding to the servo release pressure Psr is provided for the second duty solenoid valve (DSV) 122. As a result, as shown in FIG. 21, After the passage of the delay time T1 and the precharge period, a servo release pressure Psr lower then the servo apply pressure by the pressure difference _P, i.e. the initial pressure difference _P is generated. After reducing the pressure difference _P by a specified value γ at step S408, the decreased pressure difference γP is compared to a lower limit δ at step S409. This lower limit δ is a reduced pressure equivalent to the expanding force of the spring 54i of the servo cylinder 54d of the 2-4 brake 54. When the pressure difference _P becomes lower than the lower limit δ as result of repeating reduction of the pressure difference _P by the specified value γ, the lower limit δ is substituted for the pressure difference _P at step S410. This is because, when the pressure difference _P becomes lower than the lower limit δ, the spring loaded piston 54e does not move in the engaging direction in which the piston 54e tightens the brake band. On the other hand, when the turbine speed Nt reaches the before shift-end turbine speed Nto', the duty ratio is increased at a fixed rate until reaching to 100% through steps S411 and S412.

By way of this, while the servo release and 3-4 clutch apply pressure is provided which is at a level lower than the servo apply pressure by a specified pressure difference _P, the hydraulic fluid is completely discharged to engage the 2-4 brake and disengage the 3-4 brake immediately before conclusion of the 3-2 shift. Movement of the piston 54e in the engaging direction is fast immediately after commencement of the 3-2 shift due to a gradual reduction of the pressure difference _P between servo apply hydraulic fluid and servo release hydraulic fluid is gradually decreased from the initial pressure difference _Po, and, in a later stage of the 3-2 shift, the 2-4 brake 54 is gently brought into engagement due to the reduced pressure difference _P. Accordingly, the 3-2 shift is speedy concluded without being accompanied by shift shocks.

Figure 22:
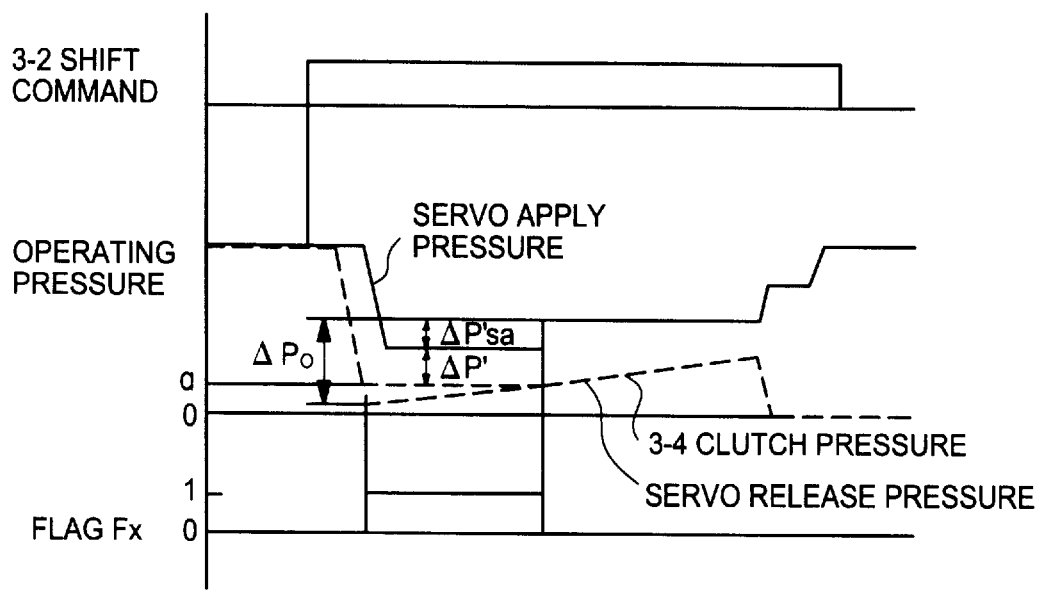
FIG. 22 is a time chart illustrating operation of controlled elements during the 3-2 down shift for low engine loads.

During a manual 3-2 shift in the low load range where hydraulic fluid is at a lower level as a whole, it possibly occur that the servo release pressure becomes lower than the specified value a as a result of reduction by the pressure difference _P. In such a case, there occurs a state where the servo release pressure does not decline during movement of the piston 54e, and the 3-4 clutch 53 encounters a retardation in disengaging operation which take a long time before conclusion of a shift to the second speed gear. In order to eliminate an occurrence of such a retardation, in the low load region where the servo release pressure Psr becomes lower than the specified value α, a reduction correction variable ΔPsa for the servo apply pressure is obtained by multiplying the difference of the specified value a from the servo release pressure Psr by a constant C at step S403. Further, after setting the low load flag Fx up at step S404, the specified value α is substituted for the servo release pressure Psr at step S405. The low load flag Fx thus set up and the reduction correction variable ΔPsa are utilized in the sequence routine of servo apply pressure control in the sequence routine shown by the flow chart in FIG. 13. When the low load flag Fx is up at step S104 in the sequence routine of servo apply pressure control, the servo apply pressure Psa is correctively decreased by the reduction correction variable ΔPsa at step S106. As a result, as shown in FIG. 22, in the low load region, while the servo release pressure Psr takes the value of the lower limit α, the pressure difference have a value ΔP' smaller than the initial pressure difference _Po. This prevents the servo apply pressure from not causing a decline during movement of the piston 54e, so as to accelerate discharging the servo release pressure and disengaging the 3-4 clutch. If the servo apply pressure Psa becomes lower than the lower limit β, it takes the value of the lower limit β at step S108 in the sequence routine of servo apply pressure control, so as to prevent the pressure difference ΔP from becoming lower the reduced pressure (lower limit) δ equivalent to the expanding force of the spring 54i of the servo cylinder 54d.

Figure 23:
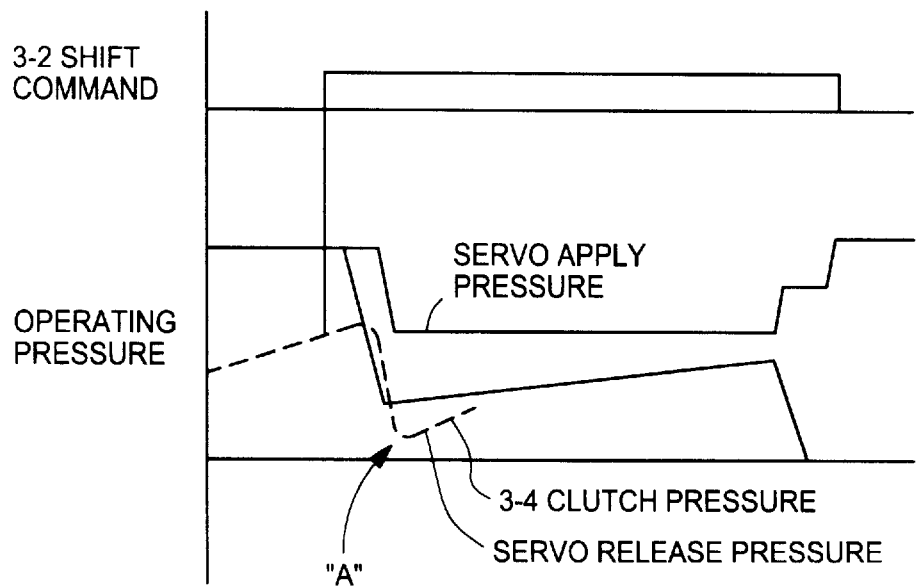
FIG. 23 is a time chart illustrating problems possibly occur in response to shift commands provided consecutively.

In the event where a 3-2 shift command is provided following a shift command to shift to the third speed gear from the second speed gear or the fourth speed gear and, as a result, a shift to the second speed gear occurs before a conclusion of the shift to the third speed gear, the following problem is possibly caused. As shown in FIG. 23, when a shift command to shift to the second speed gear before a completion of a rise of servo release pressure necessary for a shift to the third speed gear, even though it is tried to control the servo release pressure to be lower than the servo apply pressure by the pressure difference _P, an actual pressure difference becomes significantly higher immediately after commencement of a gear shift to the second speed gear as indicated with a symbol "A" with an effect of abrupt movement of the piston 54e of the servo cylinder 54, which always cases shocks during engagement of the 2-4 brake 54.

From the point of view described above, in the control sequence routine of discharging of servo release pressure and 3-4 clutch apply pressure shown by the flow chart in FIG. 19, in the event where a time lapse from an occurrence of a shift command to shift to the third speed gear is shorter than a specified time T3, the initial pressure difference _P is decreasingly changed as the time lapse becomes shorter. This prevents the actual pressure difference from becoming significantly larger immediately after commencement of the shift to the third speed gear, so as to cause a smooth engagement of the 2-4 brake even if a 3-2 shift command is provided following a shift command to shift to the third speed gear. In order to perform this control, a time is counted until an occurrence of a shift command to shift to the third speed gear starting from an occurrence of a shift command to shift to the third speed gear.

In the control in which the even-level hydraulic fluid for disengaging the 3-4 clutch 53 is controlled indirectly by the control of servo apply pressure through servo release pressure, even though the turbine speed Nt rises as desired to a target turbine speed at a shift-end following the disengagement of the 3-4 clutch 53, it is not always concluded that the piston 54e completes its movement in the engaging direction during the gear shift. Even though movement of the piston 54e is accelerated by increasing the pressure difference _P at the beginning of a gear shift, the piston 54e possibly does not complete its movement at a point of time at which the turbine speed Nt reaches the target turbine speed Nto. In such an event, the following problem is encountered.

Figure 24:
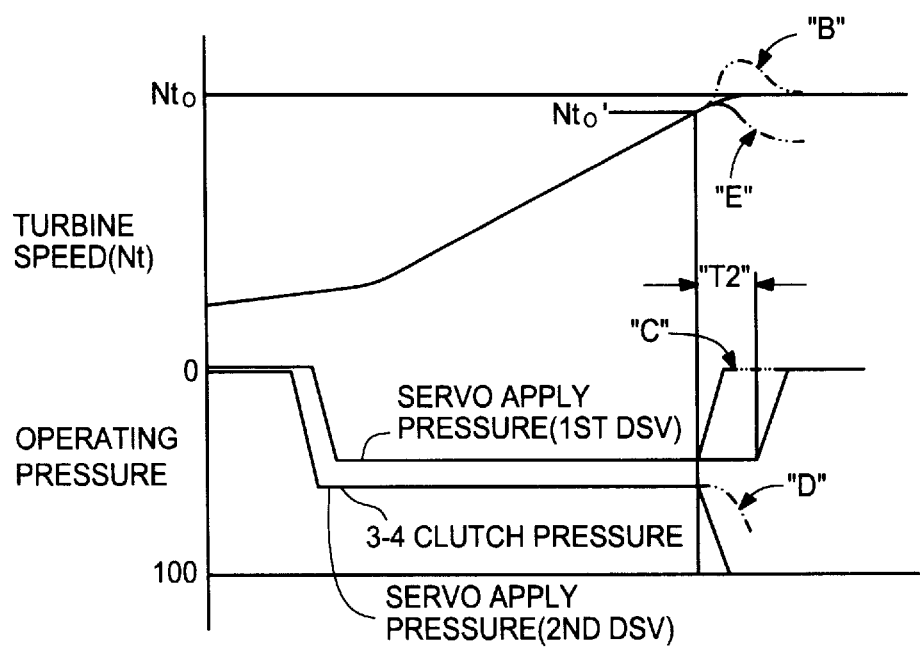
FIG. 24 is a time chart illustrating problems possibly occur at a conclusion of a gear shift.

As shown in FIG. 24, while the second duty solenoid (DSV) 122 is operated at a duty ratio of 100% so as to discharge the servo release hydraulic fluid and the 3-4 clutch apply hydraulic fluid completely at a point of time at which the turbine speed Nt reaches a before shift-end turbine speed Nto'(see steps S114, S116 and S117 in FIG. 13), the first duty solenoid valve (DSV) 121 is operated at a duty ratio of 0% so as to force the servo apply hydraulic fluid to rise to the highest level at a point of time at which the specified time T2 expires ((see steps S114, S116 and S117 in FIG. 13). If the piston 54e still leaves a part of the movement not completed at that point of time, it possibly occurs that, while the 3-4 clutch 53 is disengaged, the 2-4 brake 54 remains not engaged. In such an event, the turbine speed Nt blows up as indicated with a symbol "B" in FIG. 24. Against this problem, as indicated with a symbol "C" in FIG. 24, the first and second duty solenoid valves (DSVs) 121 and 122 may be controlled so as to force the servo apply hydraulic fluid to rise to the highest level simultaneously with causing discharge of the servo release hydraulic fluid and the 3-4 clutch apply hydraulic fluid at a point of time at which the turbine speed Nt reaches a before shift-end turbine speed Nto'. However, at this point of time, the piston 54e is still moving in the engaging direction, and, consequently, these hydraulic fluid pressure do not fall immediately as indicated with a symbol "D" in FIG. 24 even though the second duty solenoid valve (DSV) 122 is operated at a duty ratio of 100%. As a result, the 2-4 brake is engaged before the 3-4 clutch 53 has been completely disengaged, the turbine speed Nt significantly drops as indicated with a symbol "E" in FIG. 24.

In order to cope with that problem, while the servo apply hydraulic fluid pressure is appropriately risen by adding to the calculated servo apply hydraulic fluid pressure a specified value Pff as a feedforward control value until the specified time T2 has passed after the turbine speed Nt has reached a before shift-end turbine speed Nto' at step S115 in the control of transitional level hydraulic fluid shown in FIG. 13, the feedback control gain is increased through steps S308 to S310 in the feedback pressure calculation sequential routine shown in FIG. 17 (see output of first duty solenoid valve 121 indicated with a symbol "F" in FIG. 21). As a result, at the same time that the 3-4 clutch 53 is disengaged, the 2-4 brake 54 is forced to engage, the turbine speed Nt is prevented from encountering blowing up or a significant drop at a conclusion of a 3-2 gear shift. Though the pressure difference _P between servo apply hydraulic fluid and the servo release hydraulic fluid is steplessly decreased in the above embodiment, it may be decreased in steps. The control of pressure difference _P is performed by the control of servo release pressure, which means that control of the transitional level of 3-4 clutch apply hydraulic fluid is made through the first duty solenoid valve (DSV) 121 and discharging of 3-4 clutch apply hydraulic fluid is made through the second duty solenoid valve (DSV) 122. Due to this hydraulic fluid control structure, the accuracy of control of these hydraulic fluid pressure is improved more as compared with a structure in which a single duty solenoid is used to control these hydraulic fluid pressure.

Figure 25:
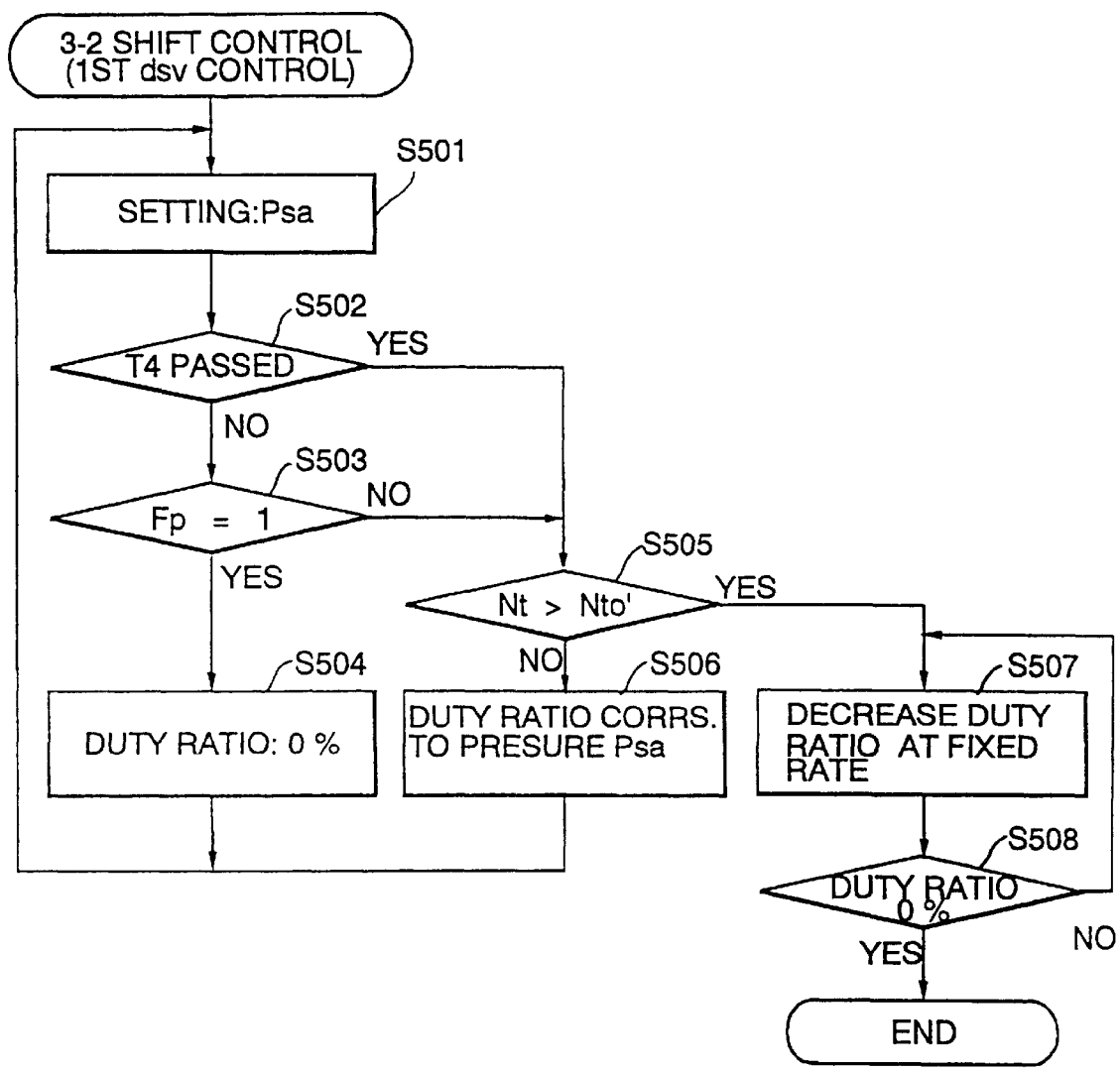
FIG. 25 is a flowchart illustrating the main routine of the first duty solenoid control (DSV) during a 3-2 down shift of the control system according to another embodiment of the invention.

FIG. 25 shows a flow chart illustrating the sequence routine of servo apply pressure control in accordance with another embodiment of the invention. This embodiment is attempted to accelerate engaging of the 2-4 brake 54 in the case, for example, of a gear shift caused by engagement of the 2-4 gear shift while the engine remains unloaded, such as a manual 3-2 shift and a back-out 3-4 shift.

The following description will be directed to a 3-2 manual down shift by way of example.

A 3-2 gear shift caused by discharging servo release hydraulic fluid and 3-4 clutch apply hydraulic fluid from the 2-4 brake and 3-4 clutch through operation of the first duty solenoid valve (DSV) 121 is achieved following the sequence routine shown illustrated by a flow chart shown in FIG. 25.

Figure 26:
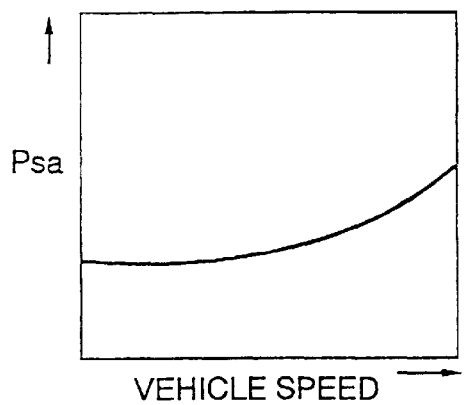
FIG. 26 is a map of servo apply pressure with respect to vehicle speed used in the servo apply pressure calculation.

When a 3-2 gear shift command is given, control passes to function block at step S501 where a basic pressure Psao is read from a pressure map with respect to vehicle speed shown in FIG. 26. The pressure map is set forth to provide higher pressure as vehicle speed is greater. This is because, in order to accelerate engagement of the 2-4 brake 54, the hydraulic fluid pressure must be higher for a higher vehicle speed with which the controlled member of a brake, such as a brake drum, turns at a higher speed. Subsequently, a determination is made at step S502 as to whether or not a back-up time T4 has passed from an occurrence of the 3-2 shift command.

After a lapse of the back-up time T4, it is further determined at step S503 as to whether or not the low load flag Fx has been set up to "1."

As was described previously, the precharge flag Fp is up during the precharge period. When it is the precharge period or before a lapse of the back-up time T4, the first duty solenoid valve (DSV) 121 is held to operate at a duty ratio of 0% at step S504 so as to precharge hydraulic fluid in the servo apply fluid chamber 54a of the 2-4 brake 54. On the other hand, when the precharge flag is down, it is determined at step S505 as to whether or not the turbine speed Nt has rached a before shift-end turbine speed Nto' which is slightly lower than a shift-end speed Nto. Before reaching the before shift-end turbine speed Nto', the first duty solenoid valve (DSV) 121 is operated at a duty ratio corresponding to the servo apply pressure Psa calculated at step S501. When the turbine speed Nt reaches the before shift-end turbine speed Nto', the duty ratio is decreased at a fixed rate until reaching 0% through steps S507 and S508.

Figure 27:
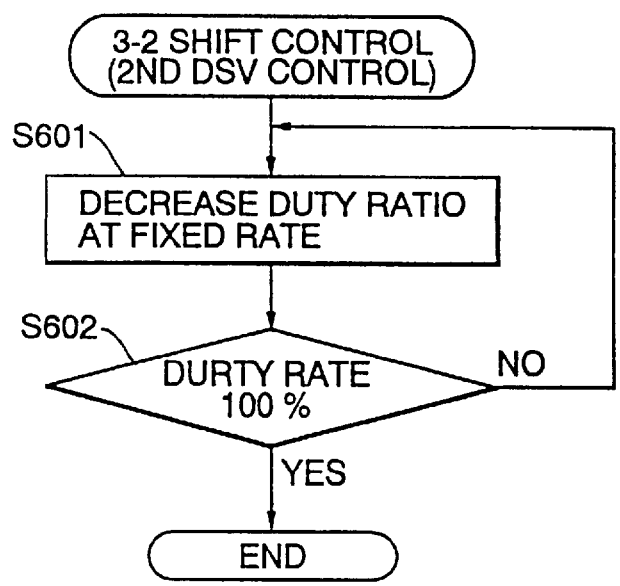
FIG. 27 is a flowchart illustrating the sequence routine of second duty solenoid valve (DSV) during the 3-2 down shift.
Figure 28:
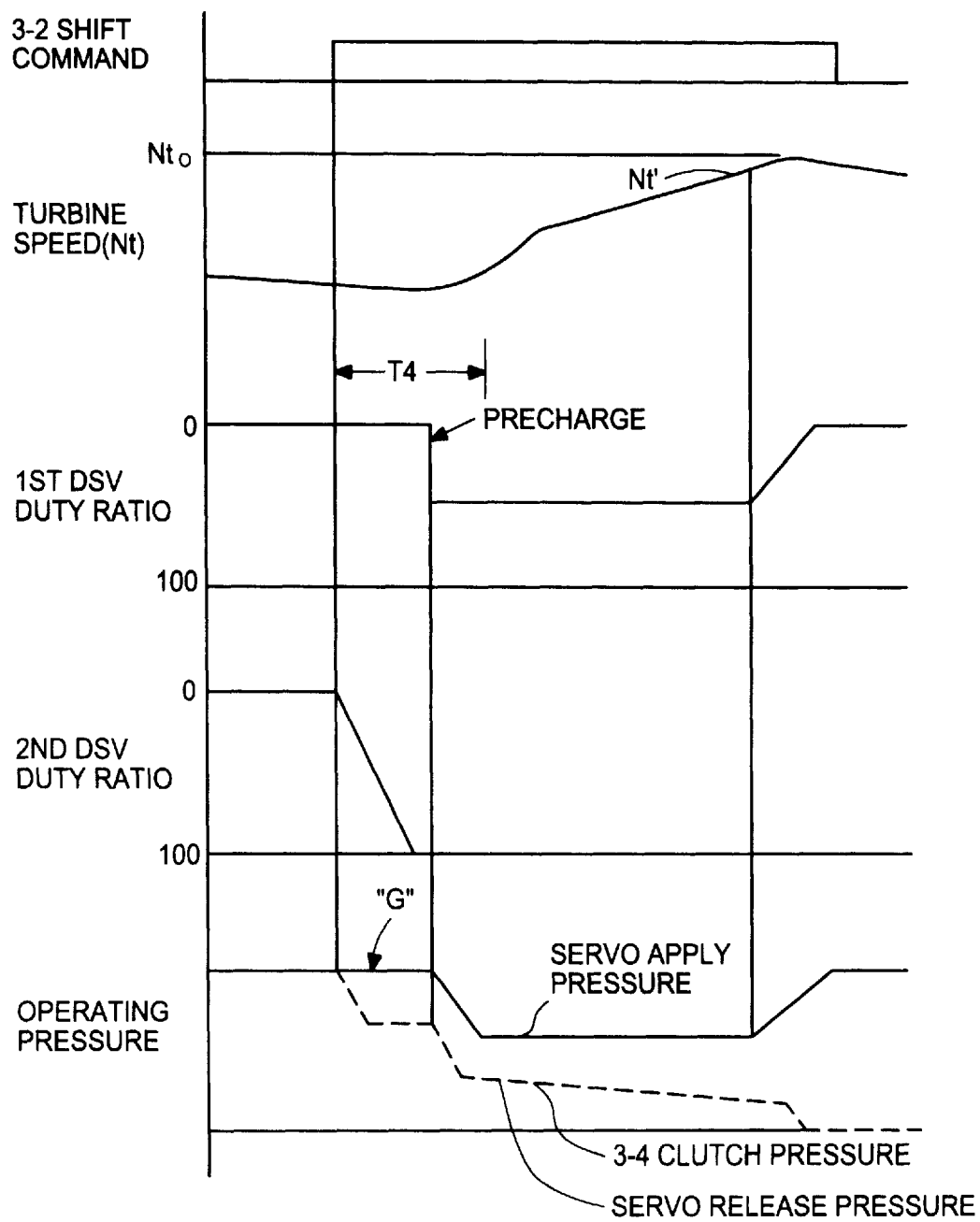
FIG. 28 is a time chart illustrating operation of controlled elements during the 3-2 down shift.

During performing the control of servo apply pressure by means of the first duty solenoid valve (DSV) 121, control of the discharge of servo release hydraulic fluid and 3-4 clutch hydraulic fluid is performed following the sequence routine illustrated by a flow chart shown in FIG. 27. That is, when a 3-2 shift command occurs, the duty ratio is increased at a fixed rate from 0% until reaching 100% through steps S601 and S602. As a result, as shown in FIG. 28, while the servo release hydraulic fluid is relatively quickly discharged, the servo apply hydraulic fluid is held at the highest level due to precharged hydraulic fluid through the first duty solenoid valve (DSV) 121 for the precharge period as indicated by a symbol "G" even after an occurrence of the 3-2 shift command. That is, hydraulic fluid is discharged from the servo release fluid chamber 54b and additionally supplied at a high pressure to the servo apply fluid chamber increasing in volume, so as to accelerate movement of the piston 54e of the 2-4 brake 54 in the engaging direction, and hence to accelerate engagement of the 2-4 brake 54 and the 2-3 gear shift.

During this control, precharging of servo apply hydraulic fluid is continued for a period calculated based on the line pressure and an increase in volume of the servo apply fluid chamber 54e, so that, while movement of the piston 54e of the servo cylinder 54d is accelerated, the 2-4 brake 54 is gently engaged after termination of precharging of servo apply hydraulic fluid.

The control of servo apply pressure is also performed for a back-out 3-2 shift during which servo release hydraulic fluid and forward clutch apply hydraulic fluid are simultaneously discharged to engage the 2-4 brake 54 and disengage the forward clutch 51.

Figure 29:
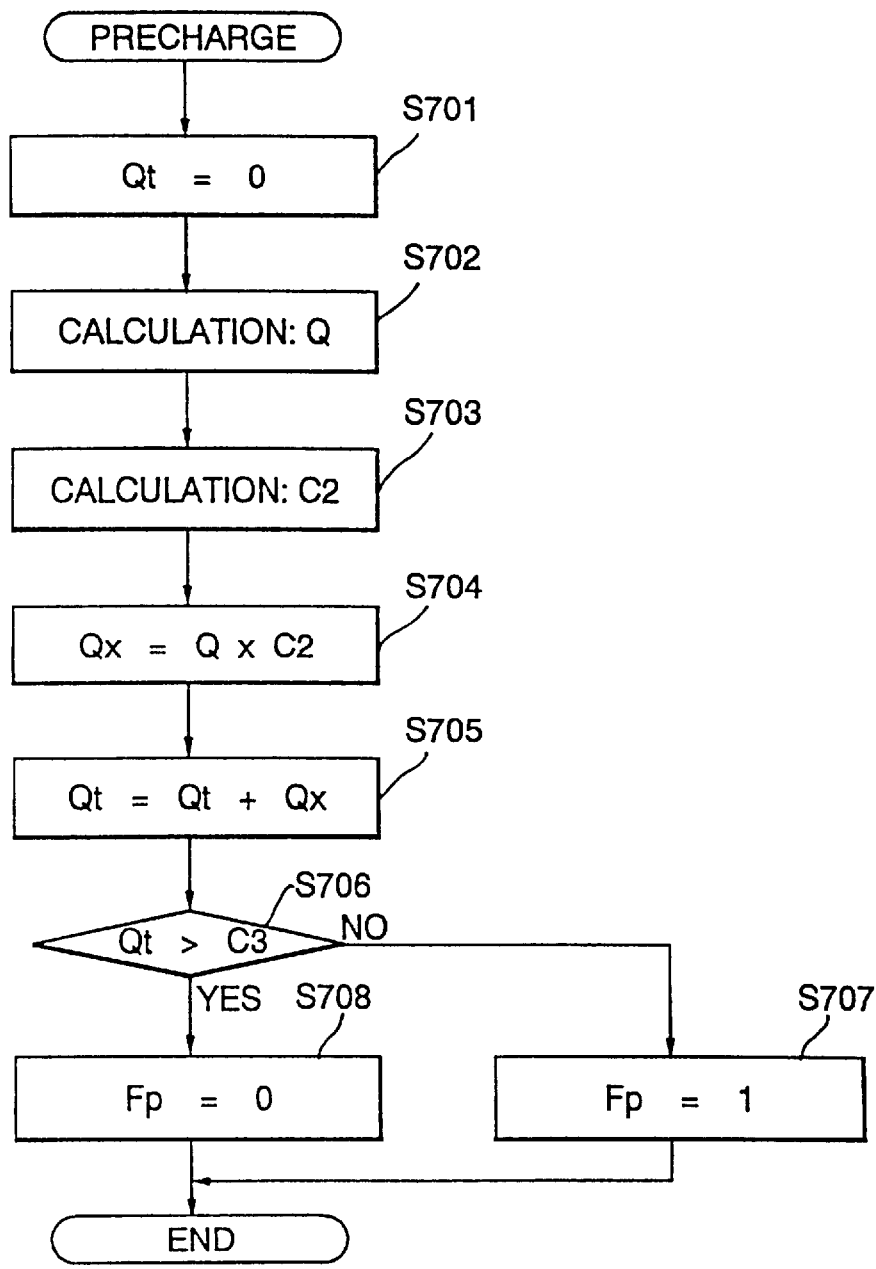
FIG. 29 is a flowchart illustrating the sequence routine of precharge interval control during the 3-2 down shift.
Figure 30:
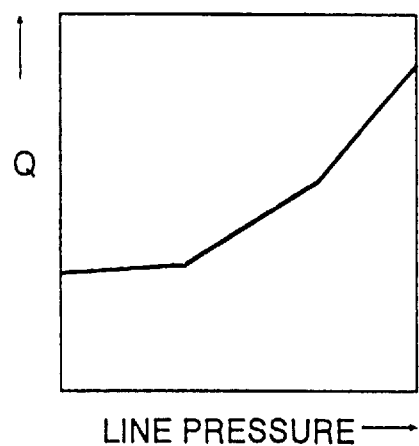
FIG. 30 is a map of flowing quantity used in the precharge interval control.

In the hydraulic pressure control circuit 100, setting of the precharge interval is performed following the flow chart illustrating the precharge interval setting sequence routine shown in FIG. 29. After resetting the total flowing quantity Qt of hydraulic fluid to 0 (zero) at step S701, a base flowing quantity Q at which the hydraulic fluid flows through the duty solenoid valve (DSV) operating at a duty ratio of 0% (i.e. operating with a full opening) is found for a current level of line pressure from a flowing quantity map established as shown in FIG. 30 at step S702. In this instance, the flowing quantity map defines the base flowing quantity Q to become higher with an increase in the line pressure. This is because even if the duty solenoid valve (DSV) is completely open, the flowing quantity Q of hydraulic fluid varies depending upon the line pressure at the time, and the higher the flowing quantity Q is, the higher the line pressure is.

Figure 31:
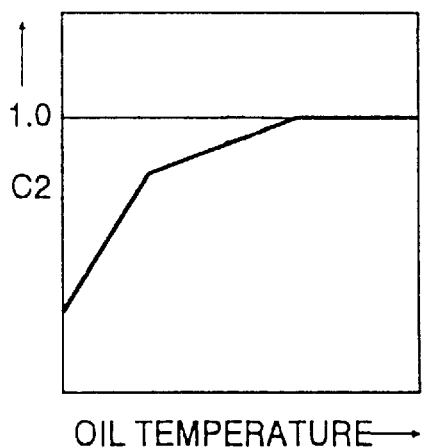
FIG. 31 is a map of fluid temperature correction coefficient used in the precharge interval control.

At step S703, a flowing quantity correction coefficient C2 on the temperature of hydraulic fluid is read from a fluid quantity correction coefficient map such as shown in FIG. 31. This fluid quantity correction coefficient map defines the correction coefficient C2 to become smaller below 1 (one) as the fluid temperature lowers. Subsequently, at step S704, a corrected flowing quantity Q' is calculated by multiplying the base flowing quantity Q by the flowing quantity correction coefficient C2. By means of the flowing quantity correction, in the event where the flowing quantity at which hydraulic fluid passes through the duty solenoid valve decreases from that under standard environmental conditions even for the same level of line pressure due to low fluid temperatures, and hence low fluid viscosity, the flowing quantity calculated suitably to actual circumstances conditions also decreases, so that the base flowing quantity Q (the corrected flowing quantity Q') is always calculated suitably to the actual flowing quantity.

Thereafter, at step S705, the corrected flowing quantity Qx is added to calculate the total flowing quantity Qt=Qt+Qx. At step S706, a determination is made as to whether or not the total flowing quantity Qt exceeds a specified quantity C3. Until the specified quantity C3 is exceeded, the precharge flag Fp is set up to "1" at step S707. On the other hand, when the specified quantity C3 is exceeded, the precharge flag Fp is reset down to "0" at step S708. In this instance, the specified quantity C3 is adapted to correspond to the volume of a fluid chamber to be precharged or an increase in volume of the fluid chamber and the volume of a fluid path leading to the fluid chamber of the fluid chamber. Accordingly, a point of time at which the base flowing quantity Q exceeds the specified quantity C3 indicates that the fluid chamber and the fluid path leading to the fluid chamber is filled with hydraulic fluid, and the precharge flag Fp is reset down at that time. Operating the duty solenoid valve (DSV) at a duty ratio of 100% while the precharge flag Fp remains up to "1" provides accelerated supply of hydraulic fluid to the fluid chamber related to the duty solenoid valve (DSV).

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. In a control system including a hydraulic pressure control circuit for an automatic transmission which comprises a transmission gear mechanism and a plurality of friction coupling elements, installed between a driving torque generator and drive wheels of an automotive vehicle, said friction coupling elements being selectively engaged and disengaged to change a torque path of the transmission gear mechanism so as thereby to provide desired gears and including at least a first friction coupling element provided with a servo apply fluid chamber and a servo release fluid chamber separated by a piston which is engaged when only said servo apply fluid chamber is supplied with hydraulic fluid and disengaged when both said servo apply fluid chamber and said servo release fluid chamber are supplied with hydraulic fluid and a second friction coupling element having a fluid chamber capable of being bring into communication with said servo release fluid chamber of said first friction coupling element which is engaged when said fluid chamber of said second friction coupling element is supplied with hydraulic fluid, said hydraulic control system comprising an improvement in that:

when shifting said transmission gear mechanism from a first gear which is achieved by supplying hydraulic fluid to said servo apply fluid chamber and said servo release fluid chamber of said first friction coupling element and said fluid chamber of said second friction coupling element to disengage said first friction coupling element and engage said second friction coupling element to a second gear which is achieved by discharging hydraulic fluid from both said servo release fluid chamber of said first friction coupling element and said fluid chamber of said second friction coupling element in communication with said servo apply fluid chamber of said first friction coupling element to engage said first friction coupling element and disengage said second friction coupling element, hydraulic fluid pressure is controlled to make a difference in pressure between said servo apply fluid chamber and said servo release fluid chamber of said first friction coupling element larger before a lapse of a specified interval from a commencement of a shift from said first gear to said second gear than after a lapse of said specified interval.

2. An automatic transmission control system as defined in claim 1, wherein said control system counts a time between a first shift of the transmission gear mechanism to said first gear and a second shift of the transmission gear mechanism to said second gear succeeding said first shift and changes said difference in pressure at the beginning of said second shift according to said time.

3. An automatic transmission control system as defined in claim 1, wherein, when said control system establishes said difference in pressure for a shift from said first gear to said second gear by substituting hydraulic fluid pressure of said servo apply fluid chamber reduced by a specified value for hydraulic fluid pressure of said servo release fluid chamber.

4. An automatic transmission control system as defined in claim 1, wherein said control system detects engine load and controls hydraulic fluid pressure in said servo apply fluid chamber of said first friction coupling element to make said difference in pressure for a shift from said first gear to said second gear smaller when detecting engine load lower than a specified value than when detecting engine load higher than said specified value.

5. In a control system including a hydraulic pressure control circuit for an automatic transmission which comprises a transmission gear mechanism and a plurality of friction coupling elements, installed between a driving torque generator and drive wheels of an automotive vehicle, said friction coupling elements being selectively engaged and disengaged to change a torque path of the transmission gear mechanism so as thereby to provide desired gears and including at least a friction coupling element provided with a servo apply fluid chamber and a servo release fluid chamber separated by a piston which is engaged when only said servo apply fluid chamber is supplied with hydraulic fluid and disengaged when both said servo apply fluid chamber and said servo release fluid chamber are supplied with hydraulic fluid, said hydraulic control system comprising an improvement in that when shifting said transmission gear mechanism from a first gear which is achieved by supplying hydraulic fluid to said servo apply fluid chamber and said servo release fluid chamber of said friction coupling element to disengage said friction coupling element and to a second gear which is achieved by discharging hydraulic fluid from said servo release fluid chamber of said friction coupling element to engage said friction coupling element, hydraulic fluid pressure in said servo apply fluid chamber is controlled to be higher for a specified period of time from a commencement of said shift than after a termination of said specified period of time.

6. An automatic transmission control system as defined in claim 5, wherein said specified period of time is established according to hydraulic fluid pressure and an increase in volume of said servo apply fluid chamber in said predetermined period of time.

* * * * *